United States Patent
Mason et al.

(10) Patent No.: US 9,857,191 B2
(45) Date of Patent: Jan. 2, 2018

(54) CONTEXT-BASED ROUTING AND ACCESS PATH SELECTION

(71) Applicant: TELOGIS, INC., Aliso Viejo, CA (US)

(72) Inventors: Ralph Mason, Christchurch (NZ); Mark Fryer, Christchurch (NZ); Michael Fried, Christchurch (NZ); Jeffrey Fiore, Berkeley, CA (US); Rick Turek, Aliso Viejo, CA (US); Brad Llewellyn, Richmond, VA (US); Peter Lear, Toronto (CA); Victor Rehorst, Toronto (CA); Steven Ashley, Christchurch (NZ); Ben Burns, Christchurch (NZ)

(73) Assignee: Telogis, Inc., Aliso Viejo, CA (US)

( * ) Notice: Subject to any disclaimer, the term of this patent is extended or adjusted under 35 U.S.C. 154(b) by 10 days.

(21) Appl. No.: 15/070,809

(22) Filed: Mar. 15, 2016

(65) Prior Publication Data

US 2016/0334236 A1    Nov. 17, 2016

Related U.S. Application Data

(63) Continuation-in-part of application No. 14/285,500, filed on May 22, 2014, now abandoned.

(51) Int. Cl.
*G01C 21/34*    (2006.01)
*G06Q 10/08*    (2012.01)
(Continued)

(52) U.S. Cl.
CPC ..... *G01C 21/3492* (2013.01); *G01C 21/3446* (2013.01); *G01C 21/3453* (2013.01);
(Continued)

(58) Field of Classification Search
CPC ............ G01C 21/3492; G01C 21/3453; G01C 21/3446; G08G 1/096861; G08G 1/22;
(Continued)

(56) References Cited

U.S. PATENT DOCUMENTS

| 5,931,888 A | 8/1999 | Hiyokawa |
| 6,336,073 B1 | 1/2002 | Ihara et al. |

(Continued)

FOREIGN PATENT DOCUMENTS

| EP | 12/02233 A1 | 5/2002 |
| JP | 2006-194638 A | 7/2006 |

OTHER PUBLICATIONS http://sites.garmin.com/dezl/; Garmin Truck Navigation; last accessed on Jun. 24, 2014, in 8 pages.
(Continued)

*Primary Examiner* — Mary D Cheung

(57) ABSTRACT

Systems and methods for determination of an access path are disclosed. The access path may include any drivable route that is within a site, and is often, but not necessarily, exclusive of roads in a road network external to the site. In some cases, access paths may include a set of streets between two or more sites without necessarily including a drivable path within a site. Further, the systems and methods may calculate or determine minimum cost routes that include the access path. In some cases, the calculated route may be the minimum cost route that includes the access path, but not necessarily a minimum cost route to a site. In other words, in some cases, the selection of an access path serves as a constraint that supersedes the calculation of a minimum cost route.

21 Claims, 32 Drawing Sheets

(51) Int. Cl.
    *G08G 1/0968* (2006.01)
    *G08G 1/0969* (2006.01)
    *G08G 1/00* (2006.01)
    *H04W 4/04* (2009.01)

(52) U.S. Cl.
    CPC ..... *G06Q 10/08355* (2013.01); *G08G 1/0969* (2013.01); *G08G 1/096816* (2013.01); *G08G 1/096838* (2013.01); *G08G 1/096861* (2013.01); *G08G 1/096883* (2013.01); *G08G 1/096894* (2013.01); *G08G 1/22* (2013.01); *H04W 4/046* (2013.01)

(58) Field of Classification Search
    CPC ........... G08G 1/0969; G08G 1/096894; G08G 1/096883; G08G 1/096816; G08G 1/096838; H04W 4/00; G06Q 10/08355
    See application file for complete search history.

(56) References Cited

U.S. PATENT DOCUMENTS

| | | | |
|---|---|---|---|
| 6,338,021 | B1 | 1/2002 | Yagyu et al. |
| 8,374,780 | B2 | 2/2013 | Mays et al. |
| 8,464,181 | B1 | 6/2013 | Bailiang et al. |
| 2006/0080034 | A1 | 4/2006 | Hayashi |
| 2007/0192111 | A1 | 8/2007 | Chasen |
| 2007/0198175 | A1 | 8/2007 | Williams |
| 2008/0275643 | A1 | 11/2008 | Yaqub et al. |
| 2009/0048776 | A1 | 2/2009 | Bouillet et al. |
| 2009/0210388 | A1 | 8/2009 | Elson et al. |
| 2009/0216438 | A1 | 8/2009 | Shafer |
| 2009/0326798 | A1 | 12/2009 | Insolia et al. |
| 2011/0087429 | A1 | 4/2011 | Trum |
| 2011/0153190 | A1 | 6/2011 | Rolinski et al. |
| 2011/0224898 | A1 | 9/2011 | Scofield |
| 2012/0101727 | A1 | 4/2012 | Mays et al. |
| 2012/0226391 | A1 | 9/2012 | Fryer et al. |
| 2012/0274642 | A1 | 11/2012 | Ofek et al. |
| 2012/0310529 | A1 | 12/2012 | Hamilton et al. |
| 2013/0006525 | A1 | 1/2013 | Stroila |
| 2013/0046559 | A1 | 2/2013 | Coleman et al. |
| 2013/0080347 | A1 | 3/2013 | Paul et al. |
| 2013/0116865 | A1 | 5/2013 | Cooper et al. |
| 2013/0195314 | A1 | 8/2013 | Wirola et al. |
| 2013/0204524 | A1 | 8/2013 | Fryer et al. |
| 2014/0365944 | A1 | 12/2014 | Moore et al. |
| 2015/0338226 | A1 | 11/2015 | Mason et al. |

OTHER PUBLICATIONS

International Search Report and Written Opinion dated Aug. 31, 2015 in PCT Application No. PCT/US2015/031795, 17 pgs.

CONTEXT-BASED ROUTING AND ACCESS PATH SELECTION

RELATED APPLICATIONS

This application is a continuation-in-part of U.S. application Ser. No. 14/285,500, filed May 22, 2014 and titled "CONTEXT-BASED ROUTING AND ACCESS PATH SELECTION," which is hereby incorporated by reference in its entirety herein for all purposes. Further, any and all applications for which a foreign or domestic priority claim is identified in the Application Data Sheet as filed with the present application are hereby incorporated by reference under 37 CFR 1.57.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a system for calculating routes for a vehicle in a vehicle fleet is disclosed. The system can include a site details repository configured to store site details information for a site. The site details information may include information regarding site locations within the site. The site locations may be other than an address or geocoded address of the site. Further, the system can include a routing module configured to generate a route for a vehicle of a fleet of vehicles from a starting location to a first site location of the site locations within the site. The routing module may be operable to at least identify a starting location for the route and receive a destination location for the route. The destination location may include an identification of the site. In addition, the routing module may determine an access path. The access path can include a portion of a drivable route between the starting location and the destination location. Moreover, the routing module can calculate the route over a plurality of links on the road network from the starting location to the destination location. The route may include the access path regardless of whether the access path represents a lowest-cost solution for the route to the destination location.

In some implementations, the access path is determined automatically based at least in part on context information relating to one or more of the vehicle, cargo carried by the vehicle, and a driver. Further, the access path may be determined by selection of the access path by a user. In some cases, the access path further comprises a drivable route within the site. Moreover, the access path further may include a set of links in the road network between a gate of the site and a location between the starting location and the destination location. This gate may be one of an entrance to the site, an exit to the site, and a bidirectional entrance and exit to the site. In some cases, the access path begins at a gate of the site.

In certain embodiments, multiple access paths exist between a gate of the site and at least one site location within the site. Further, multiple access paths may exist to or from at least one site location with the site. In addition, multiple access paths may exist to a gate of the site. In certain implementations, the lowest-cost solution includes a path configured to satisfy at least one of the following set of criteria: shortest route, fastest route, maximize use of highways, minimize use of highways, minimize toll roads, and maximize use of bonded roads.

Some embodiments here include a system for calculating routes for a vehicle in a vehicle fleet. The system may include a site details repository configured to store site details information for a site. The site details information can include information regarding site locations within the site, which may be other than an address or geocoded address of the site. The system may also include a routing module configured to generate a route of a vehicle of a fleet of vehicles from a starting location to a first site location of the site locations within the site. In some embodiments, the routing module is operable to at least receive an identity of a destination site from a set of sites. The destination site may be the site. The routing module may further be operable to access site details information for the destination site from the site details repository. In addition, the routing module may access routing criteria for routing the vehicle. The routing criteria can include context information relating to selecting an access path, which may include a drivable route from a road network to one of the site locations within the destination site. Further, the routing module may select a site location of the destination site based at least in part on the routing criteria and the site details information associated with the destination site. In addition, the routing module can select the access path to the site location based at least in part on the routing criteria and the site details information.

In certain embodiments, the routing module is further operable to select a gate of the destination site based at least in part on the routing criteria and the site details information. Further, the access path may include a drivable path between the gate and the site location. The access path may further include a set of links in the road network between the gate and a location between the starting location and the gate.

For some implementations, the routing module is further operable to calculate the route over a plurality of links on the road network from the starting location to the destination location. The route may include the access path regardless of whether the access path represents a lowest-cost solution for the route to the destination location. Moreover, the routing module can calculate the route based at least in part on the routing criteria. The routing criteria may further include selection of a cost criteria used in determining the lowest-cost solution for the route.

In some cases, the site location can include at least one of: a building at the destination site, a loading dock of the building, a refrigerated loading dock of the building, a particular side of the building, a trash location collection at the destination site, a parking location at the destination site, a delivery entrance of the building, a customer entrance of the building, a long-term parking location at the destination site, an overnight parking location at the destination site, a gate, an inner gate within the site, a security station, and a user-specified location at the destination site. In addition, the context information can include at least one of: preferences of the driver, a number of hours the driver has worked, a number of hours the driver is permitted to work over a period of time, a type of the vehicle, an owner of the vehicle, an entity associated with the vehicle fleet, characteristics of cargo carried by the vehicle, characteristics of a job to be performed by the driver, characteristics of the vehicle, a weight of the vehicle, a size of the vehicle, live traffic information, historical traffic information, current weather, and expected weather. Furthermore, the routing criteria may further include a time of day, an agreement with a governmental entity with jurisdiction over the destination site, and an agreement between en entity that owns the destination site and an entity that owns the vehicle fleet. In some cases, the context information is accessed from a number of sensors included in the vehicle. Moreover, the road network can include a plurality of links between the set of sites and excludes drivable routes within the set of sites.

Certain embodiments of the present disclosure present a system for calculating routes for a vehicle in a vehicle fleet. The system may include a site details repository configured to store site details information for a site. The site details information may include information regarding site locations within the site. This information may be other than an address or geocoded address of the site. In addition, the system can include a routing module configured to receive an identity of the site and to access the site details repository to identify site locations within the site. Further, the routing module may be configured to receive telematics information for a number of vehicles accessing the site over a period of time. The telematics information for each vehicle can be obtained from a number of sensors included in the vehicle. In addition, the routing module can determine an access path based on the telematics information and store the access path at the site details repository for use in routing vehicles to the site.

In some embodiments, the routing module is further configured to calculate a route from a location of a vehicle to a start of the access path. Further, the number of vehicles may share a particular characteristic. In addition, the routing module may be further configured to update an existing access path stored at the site details repository based on the access path. Moreover, the routing module may be further configured to determine a feature of the site based on context information of at least a subset of the number of vehicles. In some cases, determining the access path comprises determining a path traveled at the site by a threshold number of the number of vehicles.

Certain embodiments herein disclose a method of calculating a route for a vehicle in a vehicle fleet. The method may be performed under control of a hardware processor programmed with specific computer-executable instructions. Further, the method may include providing a user interface for presentation to a user. The user interface may include functionality for specifying characteristics of a route to be traveled from a starting location to a destination location. In addition, the method may include receiving an identification of a user-specified portion of the route from the user interface. Moreover, the method can include calculating a remainder of the route over a plurality of road links on a road network from the starting location to the destination location. The route may include the remainder of the route and the user-specified portion of the route regardless of whether the user-specified portion of the route represents a lowest-cost solution for the route to the destination location.

In some embodiments, the user-specified portion of the route includes an indication of one or more areas in the road network to avoid. Further, the one or more areas in the road network to avoid can include one or more of the following: one or more road links, a city, or a subset of a city. In some cases, receiving the identification of the user-specified portion of the route may include receiving a set of road links specified by the user. Further, the user-specified portion of the route can include an access path to a sub-location within a site at the destination location. The sub-location may be other than an address or geocoded address of the site.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Introduction

Figure 1:
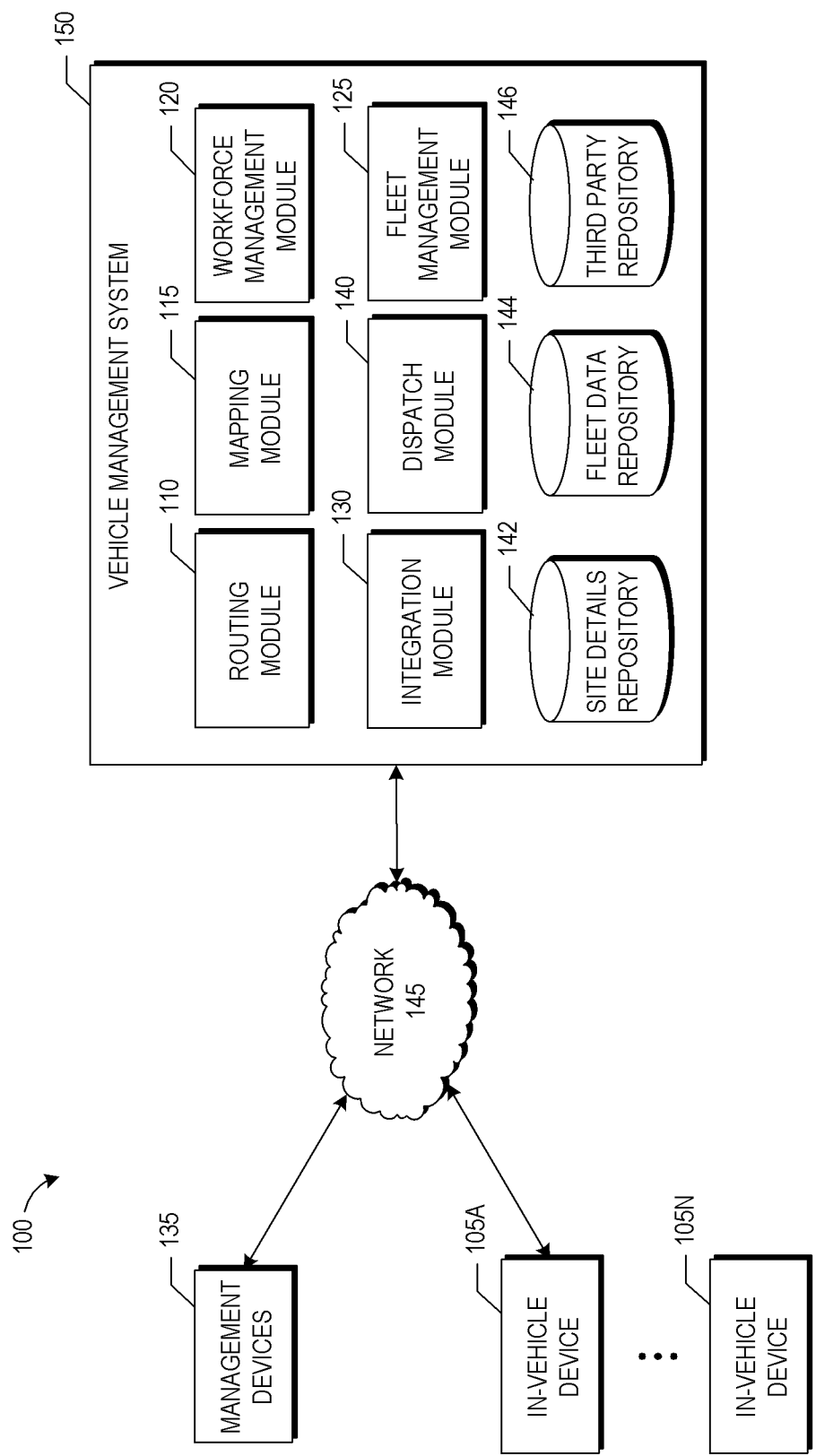
FIG. 1 illustrates an embodiment of a vehicle management system.

Typically, routing algorithms are designed to minimize cost. This cost is often time or distance-based. However, a routing algorithm that minimizes cost often neglects other routing factors that may be important to a user or driver. For example, a site may have multiple gates (e.g., points of entry or exit to a site) and a routing algorithm that minimizes cost may lead to a particular gate. However, another gate located on the opposite side of the site may be more convenient for a particular vehicle because, for example, the gate may be larger or may be closer to the driver's ultimate destination at the site (e.g., a loading dock, a particular building, etc.). Thus, although a user may want to travel a route that minimizes cost, the user may also desire that the route leads to a particular gate. Further, the user may desire that the route includes a particular path within the site. Pre-existing routing systems do not provide this functionality because, for example, many pre-existing routing systems do not provide the ability to specify particular gates, site locations within the site, or portions of a route while calculating the remaining portions of the route.

Advantageously, this disclosure describes embodiments where a user may specify an access path within a site. The access path may include any drivable route that is within the site. Typically, these drivable routes are over paths and/or streets that are often excluded from a road network, such as the road networks that are often used by mapping and/or navigation systems. Further, in some cases, the access path may include portions of the road network that are external to the site. For example, the access path may include roads leading to or from a gate at a site. In some cases, access paths may include a set of streets between two or more sites without necessarily including a drivable path within a site. Further, embodiments disclosed herein may calculate or determine minimum cost routes that include an access path. In some cases, the calculated route may be the minimum cost route that includes the access path, but not necessarily a minimum cost route to a site. In other words, in some cases, the selection of an access path serves as a constraint that supersedes the calculation of a minimum cost route.

In some embodiments disclosed herein, an access path may be selected or defined based on context information associated with a vehicle, its cargo, or a driver. Further, in some embodiments disclosed herein can determine an access path by monitoring routes taken by a set of vehicles. For example, if a particular percentage of vehicles with particular attributes (e.g., size, cargo, etc.) drive a particular path within a site or a particular path to a site for a portion of a route, and access path may be defined based on the particular path at the particular percentage of vehicles drive.

As used herein, the term "site" may refer to any location that a user may access via a vehicle. Often, the site will be associated with a geocoded tag or address. In many cases, the site may have a number of accessible features or destinations of interest, or site locations. Although some large sites may have site locations that are separately geocoded or can separately be referenced by a navigation system, oftentimes site locations are not separately identifiable. Advantageously, the embodiments disclosed herein enable site destinations to be separately identifiable and enable the drivable path to be defined between the site destinations and a road network. Some non-limiting examples of site destinations within a site can include: a particular store or office, particular garage or loading dock, particular parking location or garage, a particular entrance, a utility location (e.g., location of telephone or gas lines), a trash dumpster location, and the like. In some cases, the site may be referred to as a yard. Further, each site may have one or more gates, which may be gated or non-gated entrances or exits to the site. Further, gates may also include interior gates that may serve as entrances or exits to site destinations within the site.

To simplify discussion, much of the disclosure herein describes access paths that are drivable routes from a gate that allows entrance into a site to a site location within the site. However, as indicated above, the access paths are not limited as such and much of the disclosure herein may be applied to other types of access paths including, for example, drivable routes from a site location to a gate that allows exiting the site, access paths that include roads external to the site as well as drivable routes within the site, access paths that include roads external to the site, but that exclude roads were drivable paths within a site, and access paths that include complete end-to-end routes from a site location within one site to a site location within another site including the roads in between the sites. Further, the drivable paths within the site may also be referred to as off street segments in contrast to the on street segments, which include roads on a road network between sites.

The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

Vehicle Management System Overview

FIG. 1 illustrates an embodiment of a computing environment 100 for implementing an example vehicle management system 150. Among other features, the vehicle management system 150 can determine custom street classifications for streets of a network of streets, or a road network, and perform vehicle routing on the network of streets using the custom classifications. Further, the vehicle management system 150 may select access paths at a site that can serve as a constraint on selecting a route. In some cases, the vehicle management system 150 may automatically select the access paths based, for example, on context information associated with a vehicle. In other cases, a user may specify an access path.

In the computing environment 100, one or more in-vehicle devices 105A . . . 105N (which may collectively be referred to as "in-vehicle devices 105") and management devices 135 communicate with the vehicle management system 150 over a network 145. The in-vehicle devices 105 can include computing devices and sensors installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, vehicle sensor data, vehicle status (e.g., maintenance, tire pressure, or the like), vehicle type, cargo, vehicle direction, and so forth.

The management devices 135 can be computing devices used by dispatchers, fleet managers, administrators, or other users to manage different aspects of the vehicle management system 150. For example, a user of a management device 135 can access the vehicle management system 150 to generate routes, dispatch vehicles and drivers, define access paths, select access paths, update site details information for a site, and perform other individual vehicle or fleet management functions. With the management devices 135, users can access and monitor vehicle information obtained from one or more of the in-vehicle devices 105 by the vehicle management system 150. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 150 can be implemented by one or more physical computing devices, such as servers. These servers can be physically co-located or can be geographically separate, for example, in different data centers. In one embodiment, the vehicle management system 150 is implemented as a cloud, or network-based, computing application. For instance, the vehicle management system 150 can be a cloud-implemented platform hosted in one or more virtual servers and/or physical servers accessible to users over the Internet or other network 145. In the depicted embodiment, the vehicle management system 150 includes a routing module 110, a mapping module 115, a workforce management module 120, an integration module 130, a dispatch module 140, and a fleet management module 125. These components can, but need not, be integrated together on a common software or hardware platform.

The fleet management module 125 can include functionality for generating, rendering, or otherwise displaying a vehicle management user interface. The vehicle management user interface can include a map or list of vehicles that depicts symbols or other data representative of vehicles.

As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 125 can communicate with the mapping module 115 to obtain mapping data, which the fleet management module 125 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 125 can also access vehicle status data based on telematics data obtained from the in-vehicle devices 105. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 110 can implement any of the routing features described above. In addition, the routing module 110 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 110 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety.

In some embodiments, the routing module 110 may resolve discrepancies between an access path and a road network. Typically, the routing module 110 determines the location of roads within a road network based on mapping data provided to the routing module 110. The mapping data may, in some cases, vary over time. For example, a provider of the mapping data may slightly modify the mapping data based on technical decisions by the provider. As another example, the road network, in this mapping data, may change over time due to construction, such as lane expansion. Thus, discrepancies may build up over time between alignment of access paths and road networks external to sites. Advantageously, in certain embodiments, the routing module 110 may use one or more algorithms to realign the access paths with the road networks. Further, in some cases, the realignment algorithms can be used to realign the virtual nodes of an overlay network (which is described in more detail with respect to FIGS. 4A and 4B) with the nodes representing the roads in the road network. Some examples of algorithms that may be used to realign the access path road network include fitted history algorithms, which are described in more detail with respect to U.S. Publication No. 2012/0226391, filed Mar. 2, 2012, and entitled "Vehicle Route Calculation," the disclosure of which is hereby incorporated by reference in its entirety.

In some embodiments, the road networks and/or the data available for the road networks may change over time due, for example, to more accurate surveying, the building of new roads, the re-routing of roads, the destruction or removal of a road, and the like. When a road network is modified, the routing module 110 may adjust a route to an access path. Further, in some cases, the routing module 110 may modify a selection of an access path. For instance, suppose for example that a new road is created that results in a faster route, but which includes the use of an unprotected turn across oncoming traffic to enter an ingress of a site location for using a particular access path. In some such cases, a different access path may be selected that enables the use of the faster route while avoiding the unprotected turn to enter the site location.

In certain implementations, one or more access paths may be modified due to changes in the roads or drivable paths of the site location. For example, if the layout of the parking lot is modified, one or more access paths may be updated. In some cases, the determination of the modified access paths may be determined by monitoring the change in vehicle movement over a period of time. In some cases, the addition or removal of roads within the site location, or yard, may result in a change in the access paths.

The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110. The workforce management module 120 can provide functionality for users of the management devices 135 to schedule drivers and to monitor drivers working hours and driving hours. Advantageously, in certain embodiments, the workforce management module 120 may be used in conjunction with the dispatch module 140 and the routing module 110 to ensure that drivers comply with regulations relating to the number of hours fleet drivers are permitted to drive in a day, week, or other period of time.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. Other possible implementations of the vehicle management system 150 can include many more or fewer components than those shown in FIG. 1.

The vehicle management system 150 may also include a number of repositories. For example, the vehicle management system 150 may include a site details repository 142, a fleet data repository 144, and a third-party repository 146. The site details repository 142 may store any type of site information associated with a site. For example, the site information may include an identity of gates, an identity of site locations within the site, hours of access, the identity of specific roads and a road network that should be used or excluded from use by vehicles of a vehicle fleet servicing the site, whether drivers have permission to park their vehicles overnight at the site, etc. further, in some cases, the site information may include a map of the site.

The fleet data repository 144 may include any type of site information that is collected by particular vehicle fleet, or its users. In some cases, the fleet data repository 144 may include a copy of at least some of the information stored at the site details repository 142 that is accessible by users (e.g., drivers or dispatch operators) of the particular vehicle fleet. Advantageously, in certain embodiments, by including a separate fleet data repository 144 that can be associated with a vehicle fleet, users can annotate site information. For example, users can define access paths and decide whether or not to share the defined access paths with other vehicle fleets.

The third-party repository 146 can include any information that can be obtained from third-party sources that may relate to the site. For example, the third-party repository 146 may include property tax information that enables the vehicle management system 152 identify the property boundaries of a site. As another example, the third-party repository 146 may include weather information, traffic information, or local town ordinance information that may be used to facilitate generating a route to a site or determining an access path.

Although the site details repository 142, the fleet data repository 144, and the third-party repository 146 are illustrated as being part of the vehicle management system 150, in some embodiments one or more of the repositories may be separate systems, which may or may not be affiliated with separate entities. In some embodiments, different entities may be associated with or in control of separate vehicle management systems 150. Each of these entities or vehicle management systems 150 may have access to a single shared site details repository 142 that is implemented in a system is separate from the vehicle management systems 150. Similarly, one or more of the fleet data repository 144 and the third-party repository 146 may be shared among vehicle management systems 150. Alternatively, one or more of the vehicle management systems 150 may have its own fleet data repository 144 and/or third-party repository 146.

Routing Module Embodiments

Figure 2:
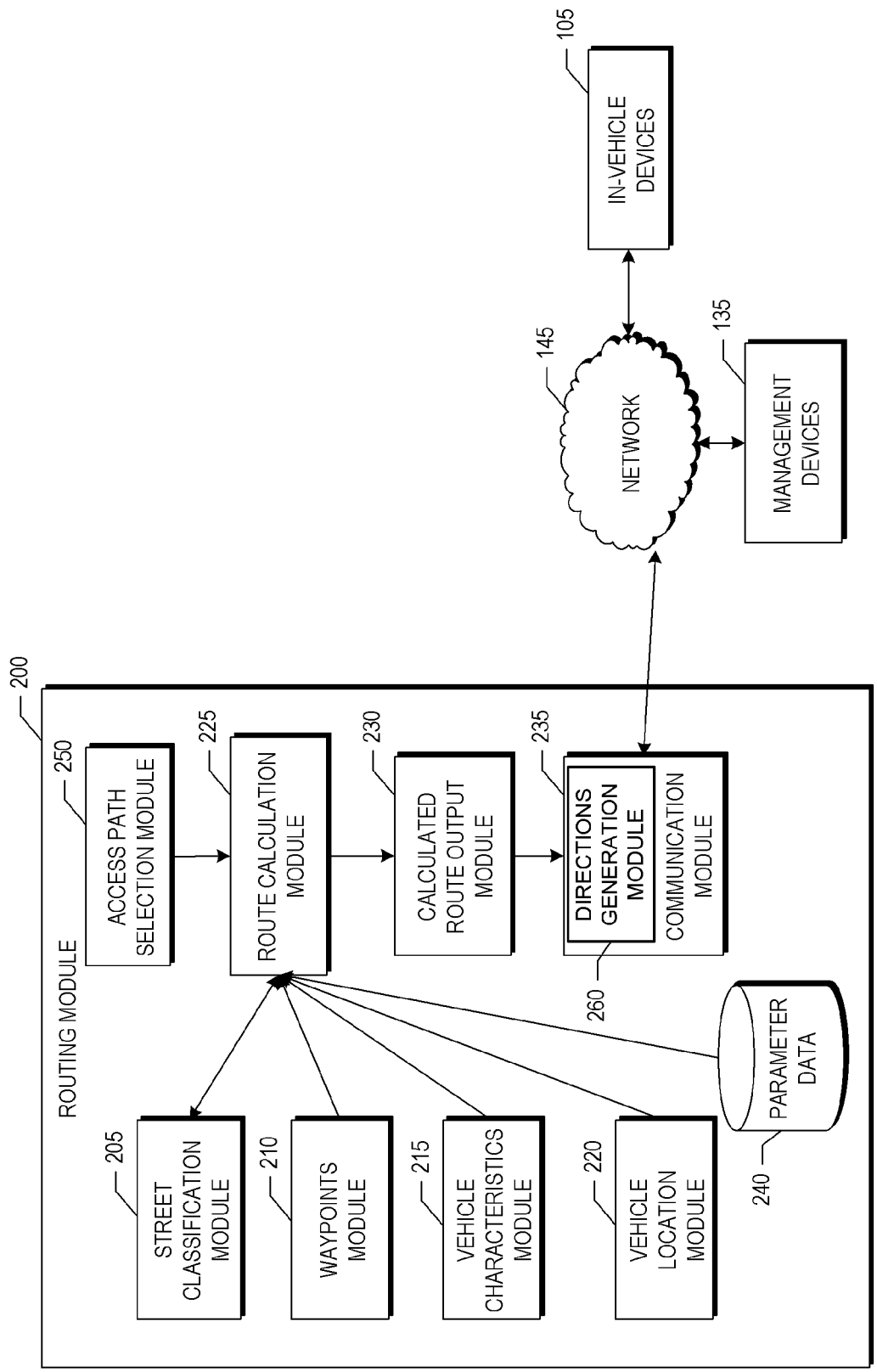
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can classify streets of a network of streets in a geographic region and use the street classifications to efficiently calculate routes for fleet vehicles on the network of streets. The management devices 135 and in-vehicle devices 105 of FIG. 1 are also shown communicating with the routing module 200 over the network 145.

In the depicted embodiment, the routing module 200 includes a street classification module 205, waypoints module 210, a vehicle characteristics module 215, a vehicle location module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like.

The waypoints module 210 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 210 from the mapping module 115 described above.

The vehicle characteristics module 215 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 220 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 210, the vehicle characteristics module 215, the vehicle location module 220, and/or the parameter database 240. In some embodiments, the route calculation module 225 determines custom routes between waypoint locations based on custom data. The custom routes can, in turn, be used by the street classification module 205 to classify streets of the custom routes for use in efficiently determining how to route fleet vehicles.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The street classification module 205 can determine street classifications at least in part based on custom routes calculated by the route calculation module 225. The street classification module 205 can receive custom routes calculated by the route calculation module 225 and analyze the custom routes to determine custom classifications, such as a score indicative of a hierarchical ranking, degree of importance, or suitability of streets for routing fleet vehicles. In some embodiments, the classification can be further based on spatial or topological relationships to other streets for routing, in addition to the class of the streets based on a street's federal or state highway status and the like, number of lanes, or other attributes of streets. The street classification module 205 can store the classifications in the parameter database 240 or outside the routing module 200 via storage connected to the network 145.

In addition, the route calculation module 225 can access and receive street classifications from the street classification module 205, the parameter database 240, or other storage connected to the network 145. The accessed and received street classifications can depend on a characteristic of a routing request (e.g., the fleet vehicle type to be routed, service level selected by the requestor, customer identification code, etc.) for a particular fleet of vehicles.

The route calculation module 225 can further use the street classifications to limit streets of the network that are considered for routing fleet vehicles. For instance, streets having a higher classification score indicative of a higher hierarchical ranking can be considered for longer distances or routes. On the other hand, streets having a classification score indicative of a lower hierarchical ranking can be considered for short distances or routes. In other embodiments, the route calculation module 225 can instead use the street classifications to weight the consideration of streets, determine degree of importance of streets, or predict function or uses of streets, among other possibilities.

The routing module 200 can further include an access path selection module 250 for selecting an access path between site locations at a site. In some embodiments, the access path selection module 250 can automatically determine an access path based on context information associated with a vehicle or its driver. In other embodiments, a user may select an access path using the access path selection module 250. In certain embodiments, the user may select the access path from a set of access path options presented to the user. In other cases, the user may define the access path using the waypoints module 210 to select waypoints within a site. In some embodiments, the access path selection module 250 may be used to specify a portion of a route between sites.

In certain embodiments, the route calculation module 225 may generate a route between sites (e.g., a location of a vehicle and a destination location) based partly on the selection of one or more access paths by a user or by the access path selection module 250. Often, a route calculation module 225 will generate a route based on routing criteria, user-supplied or otherwise, such as shortest time, or maximize highways. In certain embodiments, the selection of an access path may override, at least in part, the routing criteria. In other words, in some cases, the access path may serve as a constraint in selecting a route that takes priority over a constraint introduced by the routing criteria.

In some embodiments, the access path selection module 250 is included as part of the route calculation module 225. Advantageously, when generating a route, the route calculation module 225 may determine the optimal access path to select based, for example, on context information associated with a vehicle or its cargo. Further, the route calculation module 225 may determine an access path to select based on another site to be visited by the driver. For example, the route calculation module 225 may select an access path from a site location to an egress point of the site based on the next site to be visited. Further, in some cases, the route calculation module 225 may select an order of sites to visit based on a cost minimization function, and may select the access paths to include in a route based on the selected ordering of the sites to visit.

In some embodiments, the access path selection module 250 may select a set of eligible access paths based on the driver. For example, access paths may be selected based on the driver's ability to navigate around a tight space. As another example, and access path may be selected based on whether the driver is authorized to sleep overnight at the site. Further, the access path selection module 250 may select an access path from the set of eligible access paths for the driver based on the additional sites the driver scheduled to visit in the order of visiting the sites.

In some cases, access paths are nonoverlapping. However, in other cases, access paths may at least partially overlap. For example, a first access path from a site entrance to a loading dock may follow one drivable route and a second access path leading from the loading dock to a site exit may overlap at least partially with the first access path before veering off to another gate to exit the site. Further, in some cases, although access paths for a user (e.g., an entity associated with a first vehicle fleet) may or may not overlap, access paths for different users (e.g., entities associated with different vehicle fleets) may overlap at least in part. Moreover, in some cases, access paths that are originally identified as separate access paths may be joined to form a single access path.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving route modification based on traffic or weather conditions. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences.

Further, in certain embodiments, the voice used to express the verbal directions can be changed without changing the language of the verbal directions.

In some embodiments, the calculated route output module 230 is included at the vehicle. For example, the calculated route output module 230 may be one of the in-vehicle devices 105. In such cases, the route calculation module 225 may provide the calculated route to the calculated route output module 230 over the network 145. Alternatively, the calculated route output module 230 may work in conjunction with one or more in-vehicle devices 105.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The communication module 235 may include a directions generation module 260 is configured to generate directions that may be provided to a user (e.g., a driver) or provide information that may be used by an in-vehicle device 105 to provide directions to the user. Advantageously, in certain embodiments, the directions generation module 260 can formulate directions for an access path that includes off street paths, such as often found in a site. For instance, the directions generation module 260 may formulate directions that instruct a user to turn at a concrete island, such as is often found within a parking lot. As another example, the directions generation module 260 may formulate directions instruct a user to turn at a tree, turn into a driveway, turn onto an unnamed street, drive around the side of a building, etc.

in some embodiments, a user that is annotating a site map or is providing site details information may also provide directions that may be utilized by the directions generation module 260 when a particular access path is selected. For example, when an access path turns left in front of a building and then continues to drive around a building towards a dumpster location, a user may supply text or audio constructing a driver to turn left in front of the building and to continue driving around the building until reaching a dumpster which may be behind the building across from a loading dock near the second Oak tree, but before the olive tree for example. Thus, when a route is provided to a driver that includes the access path to the dumpster, the audio and/or visual information created by the user may be provided to the driver.

In some cases, the directions generation module 260 may generate directions in different languages based on, for example, the driver or the site location (e.g., the country, state, or region where the site is located). Further, in some cases, directions generation module 260 may translate directions provided by a user before providing the directions to a driver based on the driver or the site location.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200, such as the street classification module 205. In some embodiments, the parameter database 240 can be communicatively coupled to the network 145. As one example, the parameter database 240 can include look-up tables of information related to street classification data sets comprising street classifications. The look-up information can take characteristics of routing requests as inputs and enable look-ups of corresponding street classification data for use in routing calculations, for example. As another example, the parameter database 240 can store custom data as discussed in this disclosure for use in classifying streets.

In other embodiments, the parameter database(s) 240 or other data repositories can reside on the client computing device 135, at the dispatch center 140, within a vehicle 105, or at other remote locations communicatively coupled to the network 145.

Example Designated Access Path Routing Process

Figure 3:
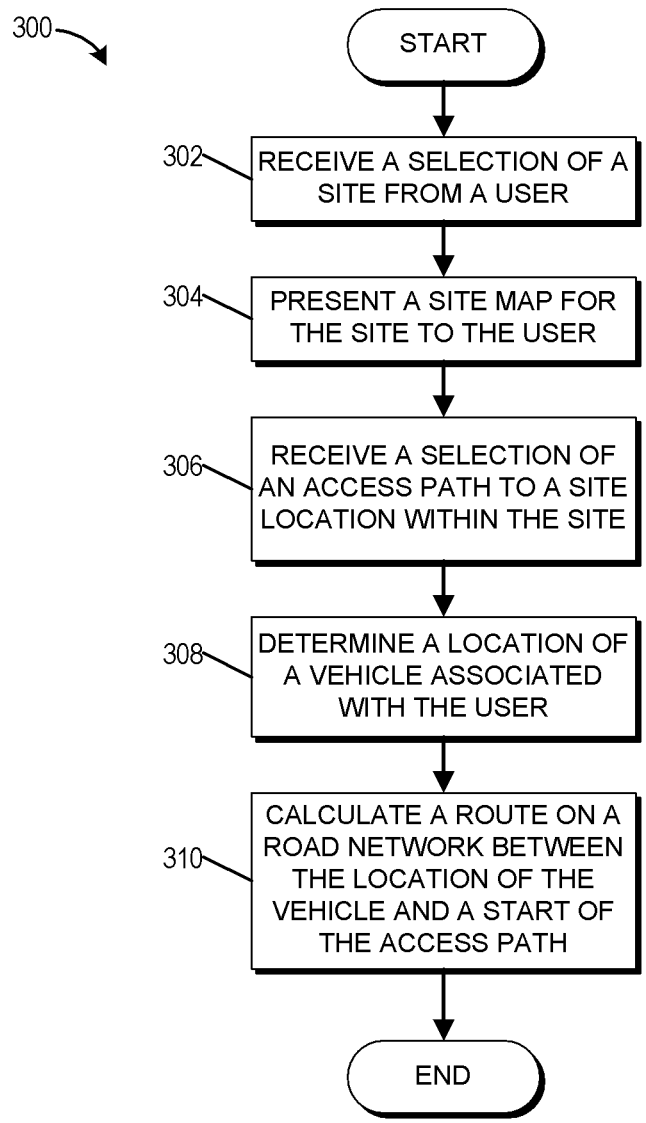
FIG. 3 presents a flowchart for an embodiment of a designated access path routing process.

FIG. 3 presents a flowchart for an embodiment of a designated access path routing process 300. The process 300 can be implemented by any system that can receive a selection of an access path at a site and can calculate a route to the site taking into account the selected access path. For example, the process 300, in whole or in part, can be implemented by a routing module 200, an access path selection module 250, or a route calculation module 225, to name a few. Although any number of systems, in whole or in part, can implement the process 300, to simplify the discussion, portions of the process 300 will be described with reference to particular systems.

The process 300 begins at block 302 where, for example, the routing module 200 receives a selection of a site from a user. The site is not limited in type, but generally includes a destination that can be reached by a vehicle, such as a truck in a vehicle fleet. Similarly, the user is not limited and may include a driver or a fleet dispatch employee, among others. The block 302 may include receiving an address, a set of coordinates, or any other type of identifier for identifying a site. Further, the user may select the site via a user interface that is presented by vehicle management system 150, a management device 135, or an in-vehicle device 105.

The user interface may also present a site map for the site to the user at block 304. Alternatively, or in addition, the block 304 may include presenting site details information associated with the site selected at the block 302. The site map and the site details information may be accessed from a site details repository 142, a fleet data repository 144, or a third-party repository 146.

At block 306, the access path selection module 250 receives a selection of an access path to a site location within the site. The access path may be selected based on the site map or site details information presented at the block 304. Further, the block 306 may include receiving a selection of an existing or previously defined access path. Alternatively, or in addition, the block 306 may include receiving a selection of a series of navigable points or intersections of a road network within the site to select an access path or to define a new access path. Moreover, defining the new access path may include selecting one or more gates at the site. These gates may be ingress or egress points between the site and a road network external to the site. In addition, gates may include ingress or egress points between different site locations within the site. For example, a gate may be an access point between a restricted area of a site and a public area of a site. In some cases, a gate may serve as both an ingress and egress point supporting bidirectional traffic, while in other cases a gate may be designated for unidirectional traffic.

At block 308, the vehicle location module 220 may determine a location of a vehicle associated with the user. In some cases, the location may be known and provided by the user. In other cases, the location may be determined from telematics information received from an in-vehicle device 105. In some cases, the vehicle may be the user's vehicle, and in other cases, the vehicle may be assigned to a different driver or user.

At block 310, the route calculation module 225 calculates a route over a plurality of links on a road network between the location of the vehicle and a start of the access path. Each link in the plurality of links may represent a street or road in the road network. In some cases, each link may be defined by intersections on each end of the link. In other words, each link may be the length of a single block as defined by two consecutive intersections. In some cases, an intersection may include a dead-end. Alternatively, each link may be defined by an intersection at which the vehicle is to turn onto the road represented by the link and an intersection at which the vehicle is to turn off of the road represented by the link. In other words, a link may be several blocks long. In some cases, the route calculated at the block 310 may be calculated based on additional routing criteria other than the selection of the access path. For example, the route may be calculated based at least in part on time, distance, use or lack of use of highways, use or lack of use of toll roads, international borders, vehicle size, vehicle cargo, or any other information that may impact the selection or calculation of a route.

Typically, although not necessarily, the selection of an access path is given priority over other routing criteria. Thus, for example, the route calculated at the block 310 may not be the shortest route or the fastest route to the site, but may instead be the shortest route or the fastest route to the start of the access path.

In certain embodiments, the process 300 may be used to determine a route that includes multiple selected access paths. For example, an access path may be selected for exiting a site where the vehicle is located and another access path may be selected for accessing a site location at another site. As another example, in cases where a route is being calculated for multiple stops, one or more access paths may be selected at each stop. In other words, a first access path may be selected to travel to a site location at a first site, a second access path may be selected to travel from the site location at the first site to a gate leaving the first site, a third access path may be selected to travel to a site location at a second site, and so on and so forth. Thus, in certain embodiments, routes and access paths can be chained together to create a traveling itinerary for a fleet driver.

Further, access paths may be generated or selected with a varying level of granularity. In some cases, access paths may be grouped in a hierarchically. A route generated by the routing module 200 may include one or more access paths based on the selection or identification of a destination site and/or a site location within the destination site. For example, the route may include a route from a starting location to a city block or some other geographic area within a threshold distance from a particular final destination. Further, the route may include a first access path from an ingress point of the city block to a set of buildings (e.g., a factory complex or a commercial site) located within the city block. In addition, the route may include a second access path from an ingress of the set of buildings to a particular location (e.g., a loading bay) within the set of buildings. Thus, it is possible for a set of routes and/or access paths to be selected or chained together to create a route between a start location and a final destination.

In certain embodiments, the process 300 may be adapted for use with access paths that are selected between sites. Advantageously, in certain embodiments, if a driver, or a user specifying a path for the driver, desires to ensure that a route includes a particular portion of a road network or excludes a particular portion of a road network, an access path between sites may be selected. For example, suppose that a driver is to leave Washington D.C. and to travel to a site in Albany, N.Y. Further, suppose that the user desires that the driver avoid being routed through Philadelphia. In such an example, the user may select an access path that defines a portion of the route between Washington D.C. and Albany, N.Y. such that the route goes through New Jersey and avoids Philadelphia. For example, the user may select an access path that includes the New Jersey Turnpike enabling a route to be calculated that avoids Philadelphia. Once the access path has been selected, the route calculation module 225 can determine the route from Washington D.C. to the start of the access path and the route from the end of the access path to the site in Albany, N.Y. In some cases, the routes before and after the access path may be calculated using constraints, such as shortest route or least traffic, selected by a user. However, a route that avoids the access path may be ignored or not selected. Alternatively, in certain embodiments, an alternative route that avoids the access path, but better satisfies the constraints compared to a route that includes the access path may be presented to a user thereby enabling the user to decide whether to select the calculated route without the access path or to confirm a desire to use a route that includes the access path. Some additional non-limiting examples of constraints that may be used in calculating the route before or after the access path may include: fastest route, maximize use of highways, minimize use of highways, minimize toll roads, maximize use of bonded roads, minimize incursion into particular areas or zoning types (e.g., urban areas, residential areas, etc.), minimize particular road features or unfavorable road features, and the like. In some cases, the unfavorable road features may include road features that delay travel, such as unprotected left turns in countries where vehicles drive on the right (or vice versa), or road features that are difficult to maneuver, such as turns with an angle that is greater than or equal to a threshold turn angle.

In some embodiments, a user may specify an access path that comprises the entire route between the location of the vehicle and the site location within the site. In such embodiments, the block 310 may be optional or omitted. In other such embodiments, the block 310 may calculate the route to confirm that the access path defined by the user is a viable route (e.g., does not involve the user driving through a wall or the wrong direction down a one-way street).

Sometimes a user will not accurately follow a particular route. This may occur, for example, because the user made a mistake (e.g., missed a turn), an unexpected closure of a road (e.g., an accident or flooding closed a road), or the user made a detour (e.g., because of traffic or errands). In some such cases, the process 300 may be repeated at least in part. For example, operations associated with the block 308 may be repeated to identify a current location of the vehicle. A new route may be calculated based on the updated location of the vehicle. In some cases, the new route may include the selection of a new access path, which may be selected by the user or automatically by the routing module 200.

Calculating a Route that Includes an Access Path

As described with respect to FIG. 3, a routing module (e.g., the routing module 110 or the routing module 200)

may calculate a route on a road network that includes one or more defined approaches, departures, or other defined subroutes between two or more locations (e.g., access paths). Several approaches are possible for determining a route that includes an access path. For example, the routing module 200 may use a cost-based approach, a restriction-based approach, or a virtual overlay-based approach to generate a route that includes the access path, to name a few. In some cases, other routing algorithms may be performed instead of or in addition to the above examples. Although each of these approaches are described separately below, in some embodiments two or more of these approaches may be combined with each other, or combined with other routing algorithms.

In the cost-based approach, a cost associated with links, or roads, in the access path is artificially reduced by some percentage. The cost may be based on one or more factors or criteria used to generate a route. For example, the cost may be associated with the length of a road, or the time required to traverse the road while driving at a particular speed, the number of lanes in the road, etc. Typically, the cost is reduced by a significant percentage (e.g., 50%, 75%, 90%, 99% etc.) to increase the chances that a route generated using a routing algorithm will include the roads of the access path. In some cases, the cost of the links comprising the access path may even be reduced to zero. In certain embodiments, the percentage that the cost of the links is reduced is based on the cost of nearby links, which may include links that share nodes (e.g., intersections in the road network). The cost-based approach may also include decreasing the cost of links, or roads, that are adjacent to, or nearby, to neighboring links, or links that share a node or intersection, of the links included in the access path. Typically, the cost of the neighboring links is reduced by a smaller amount than the cost of the links included in the access path. Further, links that are adjacent to the links that are adjacent to the access path may have costs reduced by an even smaller amount, and so on and so forth. In some cases, only roads that are a defined degree of separation from the roads included in the access path have their cost reduced. For example, roads associated with links in a graph that are up to two links away from links included in the access path may have their cost reduced, while roads that are associated with links more than two links away from links included in the access path may not have their cost reduced.

The restriction-based approach is similar to the cost-based approach. However, instead of reducing the cost of the links included in the access path, the links neighboring the access path are marked as restricted. The restricted links are then ignored when determining a route between locations. As an alternative, instead of marking the neighboring links as restricted, the cost of the neighboring links may be increased by significant percentage (e.g., 200%, 400%, 1000%, etc.) such that a cost reducing routing algorithm would be unlikely to select a route that did not include the access path.

The virtual overlay based algorithm may include creating virtual nodes for each intersection included in the access path and connecting the virtual nodes to the real street network via unidirectional virtual links leading from the nodes representing the real intersections to the nodes representing the virtual intersections. Generally, the unidirectional virtual links only exist between real intersections and the overlaid virtual intersections where an exact match exists between the locations, or when the access path turns off of a street in the road network. Added virtual nodes may then be linked to each other in an order matching the order of the real links, or links of the real roads in the road network, via virtual unidirectional links, which point in the direction of the access path. Where these virtual links overlap with real street links, the metadata of the virtual links is set to match the metadata of the corresponding real street links thereby facilitating correct cost calculations based on cost criteria, such as speed limits, turn restrictions, lane counts, road grade, road incline percentage, and other such cost criteria. To prevent the routing module 200 from shortcutting the network, a penalty cost may be added to each of the virtual links which join the overlay network to the real street network. This penalty cost may be set such that the total calculated distance or time cost of the access path is constant, no matter where it is joined. Further, in some cases, the penalty cost may be equal to a summation of the cost of traveling the corresponding real roads in the network up to the intersection corresponding to the virtual node.

Figure 4A:
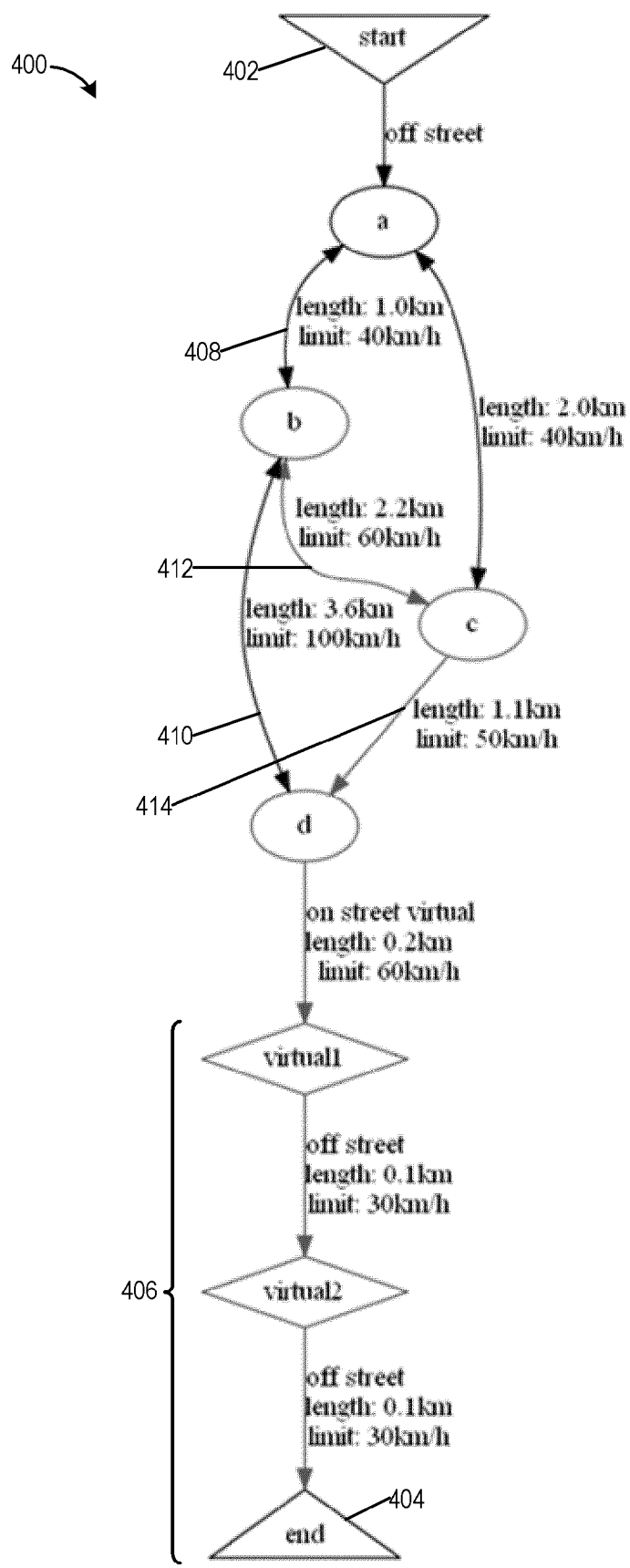
FIGS. 4A-4B illustrate embodiments of graphs used by a routing engine to determine a route that includes an access path.

FIG. 4A illustrates an example graph 400 of a road network that includes an access path. Each of the circular nodes a-d in the graph represent on-street intersections, or intersections that are included in a road network that exists between sites. For example, each of the nodes a-d may represent stop signs, traffic lights, highway on ramps, highway off ramps, or intersections between two or more streets. The diamond nodes, virtual1 and virtual2, represent intersections that exist outside of the road network. For example, virtual1 and virtual2 may represent intersections within a site, such as a parking lot or streets within a gated compound (e.g., a military compound, a gated community, an office park, etc.) that may, in some cases, not be included as part of the road network despite comprising roads. As another example, virtual1 may represent a turning into a site that is in the middle of a street that leads from node d. This turning may be considered as a path that takes the driver off-street. The node d may represent the last intersection before reaching a site 406 and the node virtual one may represent a gate or an entrance to the site 406. As illustrated in FIG. 4A, the graph 400 may include the identification of cost criteria used to generate a cost for a path, which in the illustrated embodiment includes the length of the road and a speed limit on the road.

As an example, suppose that a driver is to travel between the start location 402, which may represent, for example, a vehicle fleet yard or a warehouse or distribution center, and an end location 404, which may represent a site location within the site 406, such as a loading dock. In this example, suppose that the user has selected fastest route as a criteria for calculating the route. Further, to simplify the example, suppose that the length of each road in the speed limit on each road are the only criteria that impact the cost calculation. In such an example, the optimal route between the start location 402 and the end location 404 would include traveling the links between the intersections represented by nodes a, b, and d. In other words, the optimal path would lead the driver along links 408 and 410 for a total cost of approximately 3.66 minutes. However, suppose that a user desires to skip the road between the intersections b and d represented by the link 410 because, for example, the user is aware that there is ongoing construction within an accident just occurred on the road represented by the link 410. In such a case, the user can cause the routing module 200 to generate a different route that may not necessarily be the lowest-cost route by selecting an access path for a portion of the route. This access path can include the roads represented by the links 412 and 414. Further, the access path may include the links represented by the roads between the node d and the end location 404.

To improve the likelihood that the routing module 200 uses the access path in calculating its route, the cost of the link 410 may be increased and/or the cost of the links 412 and 414 may be decreased. Alternatively, the link 410 may be marked as restricted or temporarily deleted from the graph 400. As yet another alternative, a virtual overlay network may be generated and added to the graph 400. This approach is described in more detail with respect to FIG. 4B.

Figure 4B:
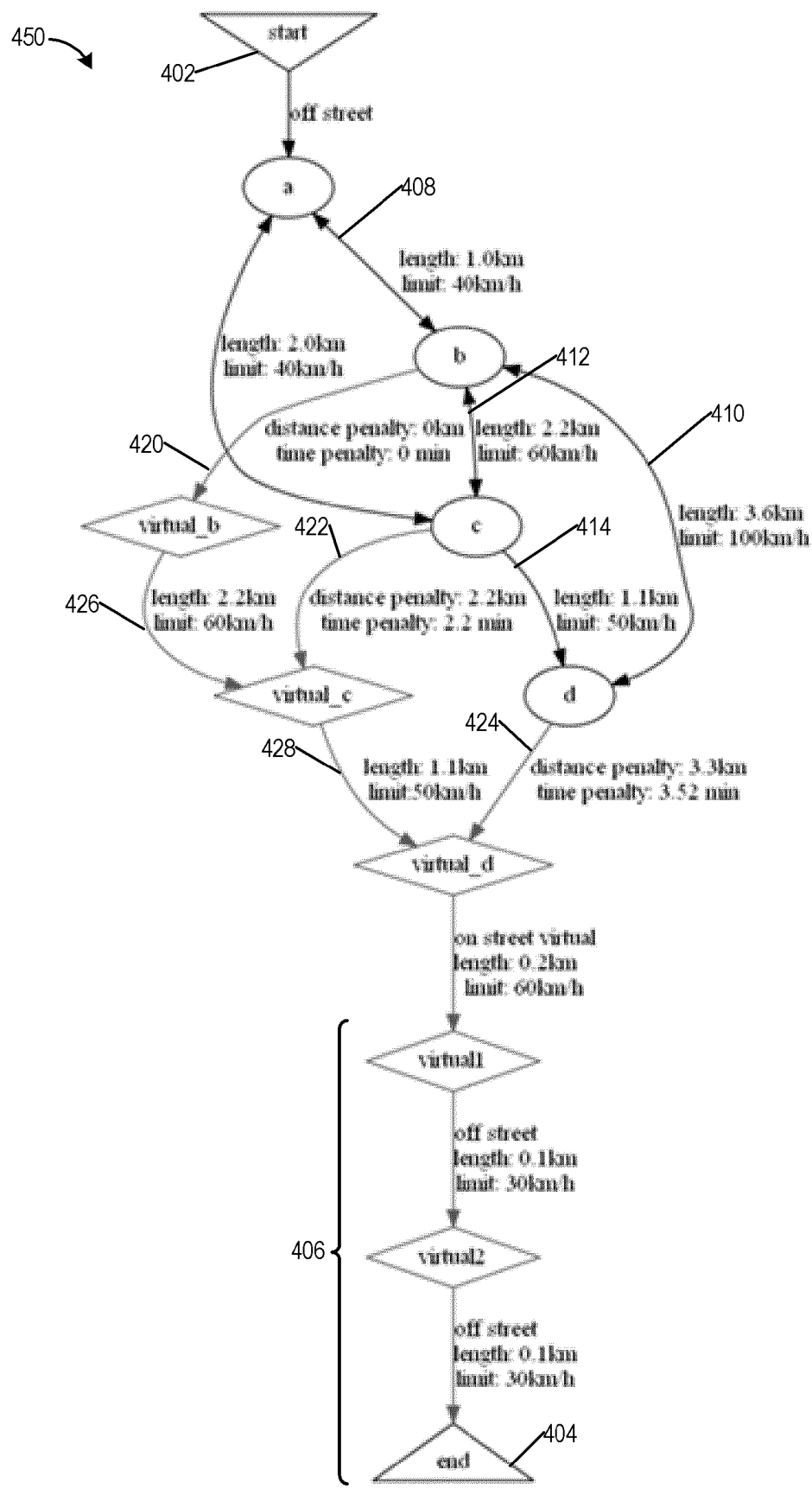

FIG. 4B illustrates an embodiment of a graph 450 that includes a virtual overlay network for facilitating calculation of a route that uses the access path described above with respect to FIG. 4A. To simplify illustration, some of the links between the nodes have been rearranged. However, edges of the graph 450 with the same reference numeral as edges of the graph 400 correspond to the same links.

In the example illustrated in FIG. 4B, a virtual node is created for each node that is part of the access path selected by the user, or an automated system. Thus, virtual_b corresponds to node B, virtual_c corresponds to node c, and virtual_d corresponds to node d. Each of the virtual nodes is equivalent to its corresponding node with respect to the road network or the drivable paths within a site. In other words, the intersection corresponding to virtual_b is equivalent to the intersection corresponding to node B. Further, a zero cost unidirectional link is created between the first node in the access path (e.g., node b) and its corresponding virtual node (e.g., virtual_b). The unidirectional link is created to lead from the node to the virtual node. As the routing cost is based on time of travel in this example, the distance and time attributes are both set to zero for the virtual link 420 between the node B and the virtual node virtual_b. Virtual links may then be placed between each of the virtual nodes is represented by the links 426 and 428. Each of the virtual links between the virtual nodes is configured to have the same cost as the corresponding links between the real nodes. In other words, the cost of traveling between virtual_b and virtual_c is equivalent traveling between node b and node c. Further, each of the virtual links represents the same road as the corresponding non-virtual link. In other words, the virtual link 426 represents the same road, or drivable path within a site, as the link 412.

As can be seen from the graph 450, because the virtual node virtual_d is placed between the node d and the node virtual one representing the entrance to the site 406, a route leading to the site 406 will include the node virtual_d. As the cost of the link 420 is nonexistent, the routing module 200 would include the link 420 as part of a route where all other options are costlier. However, as the cost of the virtual links 426 and 428 correspond to the costs of the corresponding real links 412 and 414, respectively, the routing module 200 might select the link 410 instead of the link 420 that begins the access path. To prevent the routing module 200 from avoiding the access path, a penalty is applied to the virtual links between the real nodes in the virtual nodes that are subsequent to the node representing the start of the access path. In the example illustrated in FIG. 4B, the penalty applied to the virtual links 422 and 424 are equivalent to the summation of the corresponding real links leading to the real, or non-virtual, nodes. In other words, the penalty applied to the virtual link 422 is equal to the cost of the link 412, and the penalty applied to the virtual link 424 is equal to the cost of the links 412 and 414 combined. Thus, a minimal cost route will include a route and leads from node B2 virtual node virtual_d through the nodes virtual_b and virtual_c. Advantageously, in certain embodiments, by applying penalties to the virtual links 422 and 424, when a driver makes a wrong turn leading off of the lowest-cost route, the routing module 200 can determine whether it is cheaper to return to the first node of the access path or to rejoin the access path through a later virtual link.

FIGS. 4A and 4B have generally been described with respect to node-based routing where each of the circular nodes represents an intersection or a virtual intersection. However, it is also possible to apply the graphing techniques described with respect to FIGS. 4A and 4B to edge-based routing algorithms. For example, each of the circular nodes may represent streets or roads and a road network, and the links between the circular nodes may represent intersections.

In some embodiments, restrictions on routes due, for example, to context information associated with the vehicle may be integrated into the graphs by incorporating penalty values into paths. For example, if a particular vehicle is too tall to travel along a particular route, the penalty applied to the route or street between the intersections may be increased an amount that is high enough to prevent the routing module 200 from selecting the particular segment in the graph. In other cases, the segment or link may be removed to prevent selection. For example, if vehicles of a particular weight are required to follow a bonded path to the site 406 that may include traveling on roads between intersections b, c, and d to the site 406, but excludes the road that leads from the intersection d to the site 406, the virtual links 422 and 424 may be deleted from the graph preventing a route being calculated that leads from node c or d that comes from elsewhere instead of b through to d. In some cases, penalties may be applied and/or links may be removed to ensure that restrictions are followed or to allow restrictions to be overridden. In some embodiments, if a particular path is preferred over another path, penalties may be applied to the nonpreferred path to reduce the probability that is chosen by the routing module 200. If on the other hand a particular path is restricted, for example to a bonded route or path, then a restricted path may be removed from the graph completely prevented selection.

Example Sites with Access Paths

Figure 5A:
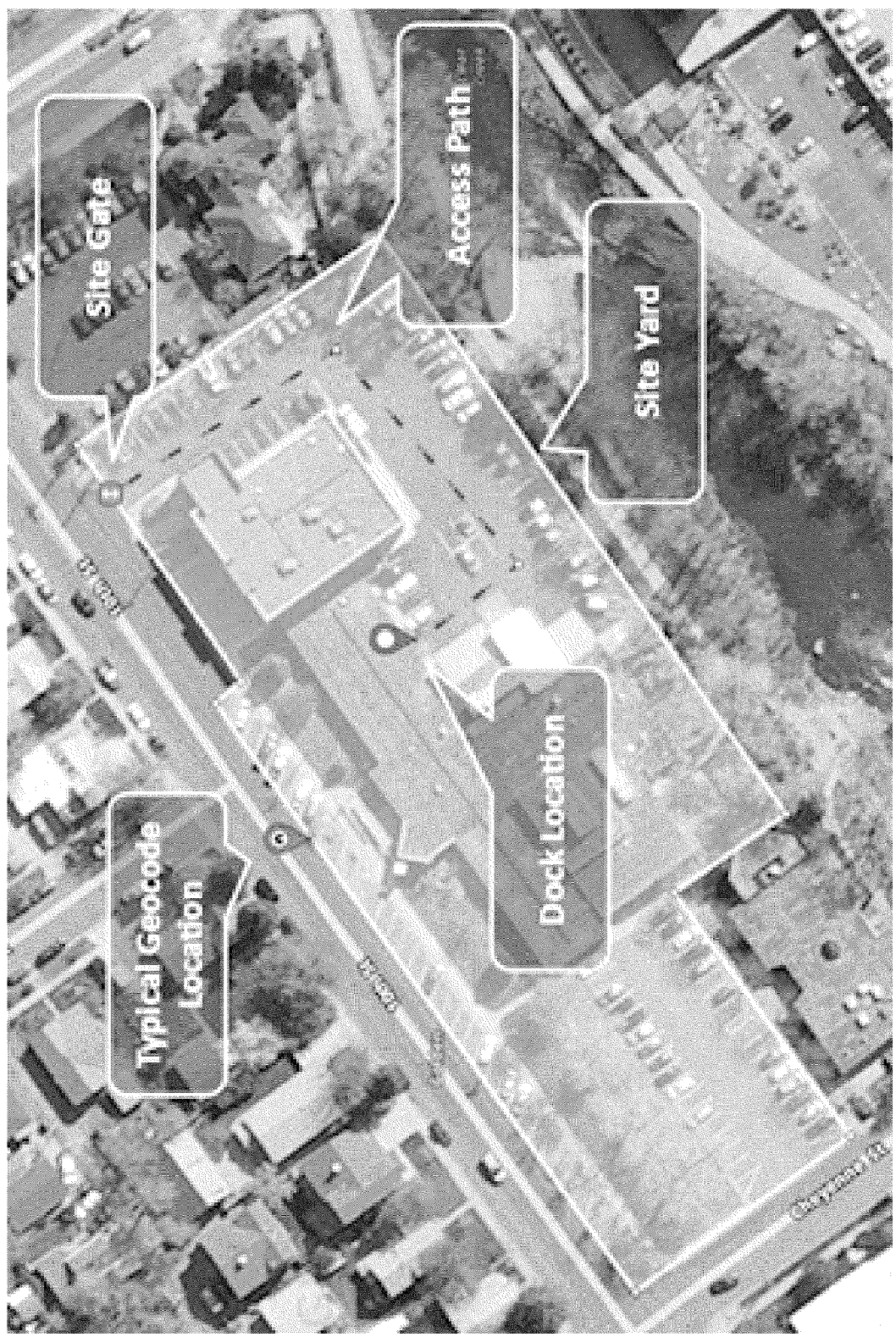
FIGS. 5A-5B illustrate examples of sites with defined access paths.
Figure 5B:
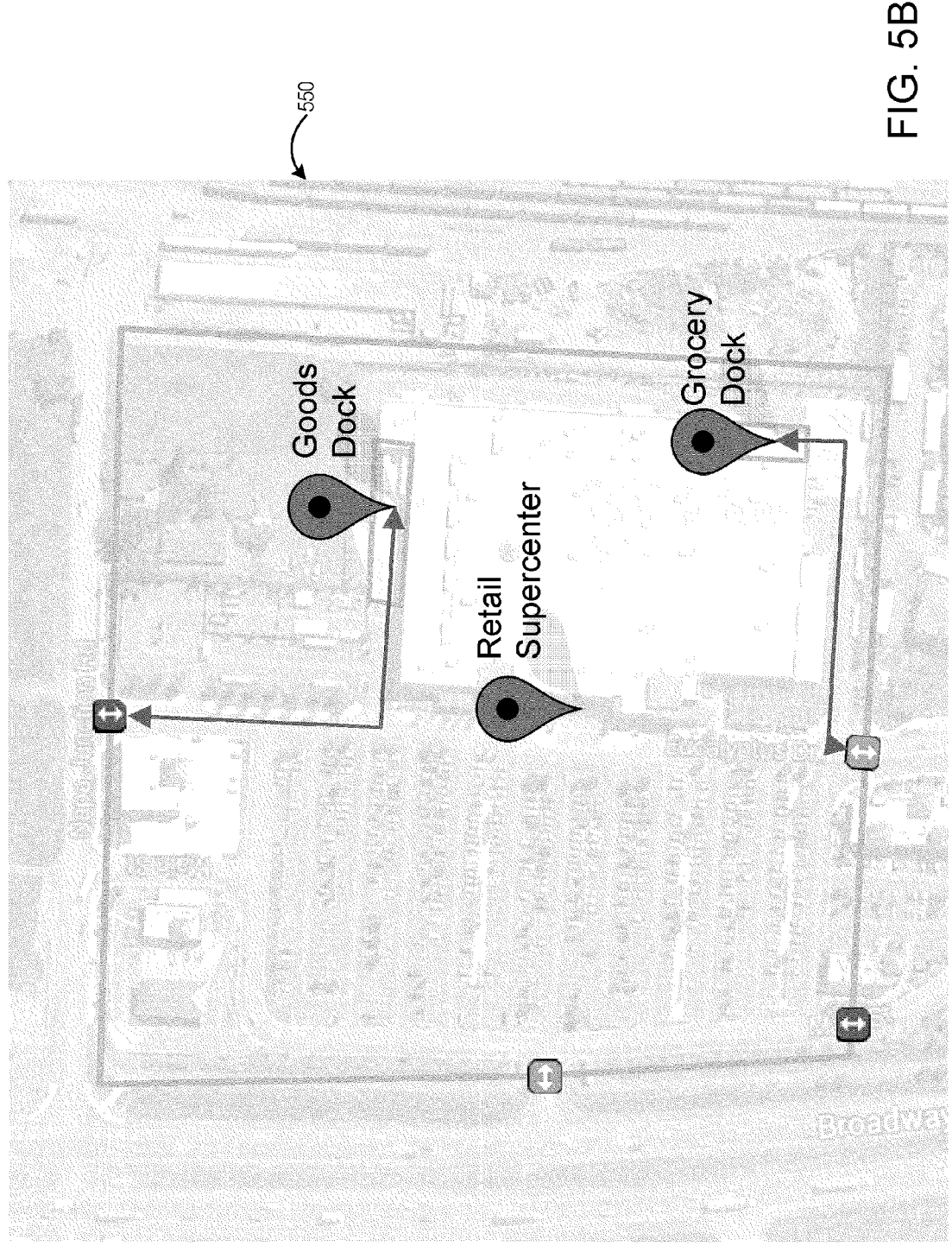

FIGS. 5A-5B illustrate examples of sites with defined access paths. FIG. 5A represents a site 500 that is associated with a geocoded location. The site 500 is defined by a site yard that surrounds the site 500. Although a wall or fence may correspond to the borders of the site yard, the site yard is not necessarily identified by a physical border, but may instead be conceptual. As can be seen in FIG. 5A, the site 500 may include a number of site locations that are accessible by a vehicle. For example, the site 500 includes three separate parking areas. Further, the site 500 includes a dock location for loading and unloading from a vehicle, which is accessible from one of the three parking lots, but not the remaining two parking lots. However, when identifying the site 500 to a navigation device, the geocoded location does not typically allow for selection of different locations within the site. Thus, the calculated route may not necessarily be the most efficient route. Further, a driver unfamiliar with the site may not be aware of the gate or entrance to use to access a particular site location, such as the dock. However, if information about the site has been stored at one or more of the site details repository 142, the fleet data repository 144, and the third-party repository 146, a user may between the site gate and the dock location. By selecting her defining the access path, the user can cause the routing module 200 to calculate a route that leads the driver to the correct site gate and towards the dock location.

FIG. 5B illustrates another site 550 is associated with another geocoded location. As can be seen in FIG. 5B, a number of site locations of interest within the site 550 may exist. For example, the site 550 includes a main entrance in front of a main parking area, a grocery dock, and a goods dock. Each of the site locations may be of interest to different users. Further, the site 550 includes a number of gates that allow both entrance to and exit of the site 550. However, depending on the site location of interest, it may be easier to navigate to the site location from one entrance or gate compared to another entrance or gate. For instance, it is likely to be easier to navigate to the grocery dock from one of the southern gates compared to navigating to the grocery dock from the north gate. Thus, a user may define a number of access paths to facilitate travel to the desired site location within the site 550. In the example illustrated in FIG. 5B, and access path has been defined between one of the southern gates and the grocery dock and another access path has been defined between the north gate and the goods dock. Thus, a user desiring a route to the goods dock may select the corresponding access path. The routing module 200 may then calculate the lowest-cost route to the start of the access path. Further, by defining the access path, in some embodiments, a navigation mechanism (e.g., an in-vehicle device 105) can navigate a driver, or may facilitate navigation, from the gate to the site location regardless of whether the drivable location is included as part of the mapped road network provided to the navigation mechanism.

Example Context-Based Access Path Selection Process

Much of the prior discussion relates to a user selecting an access path. However, in some embodiments, a vehicle management system 150 or a routing module may automatically select an access path, or may present a set of access paths from which a user may choose, based on context information available to the vehicle management system.

Figure 6:
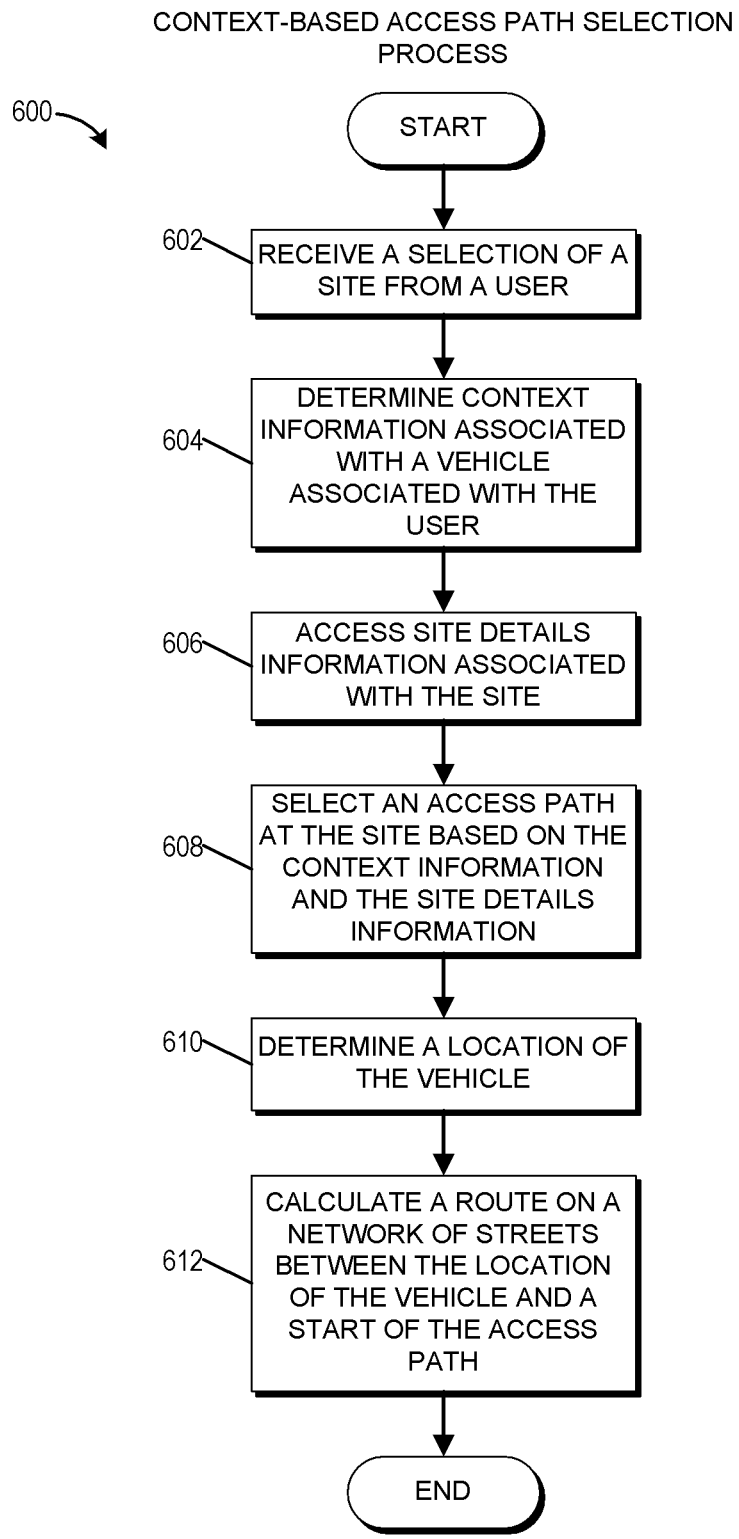
FIG. 6 illustrates a context-based access path selection process.

FIG. 6 illustrates a context-based access path selection process 600. The process 600 can be implemented by any system that can access context information that can be used to determine an access path and that can calculate a route to a site that includes the access path. For example, the process 600, in whole or in part, can be implemented by a routing module 200, an access path selection module 250, or a route calculation module 225, to name a few. Although any number of systems, in whole or in part, can implement the process 600, to simplify the discussion, portions of the process 600 will be described with reference to particular systems.

The process 600 begins at block 602 where, for example, the routing module 200 receives a selection of a site from a user. The block 602 may include one or more of the embodiments described above with respect to the block 302. At the block 604, the routing module 200 determines context information that may be used to define or select an access path. This context information may be associated with a particular vehicle, a vehicle fleet, an entity that employs the user, and/or the site selected at the block 602. In some cases, context information can be accessed from one or more of the in-vehicle devices 105. Further, context information may be accessed from one or more of the site details repository 142, fleet data repository 144, and third-party repository 146. In addition, some context information may be obtained from the parameter data repository 240. Generally, the context information can include any type of information that may facilitate either selecting or defining an access path at the site selected at the block 602 or between a location of the vehicle and the site. Further, as an access path may include both a drivable route at a site and at least a portion of a road network external to the site, the context information may include both information for defining a route internal to a site as well as information for defining a route external to a site. Although the context information is not limited, and some examples of context information that may be used for defining or selecting an access path include the following: a type of vehicle, a size of the vehicle, weight of the vehicle, an entity that owns, leases, or otherwise uses the vehicle, cargo carried by the vehicle, a purpose for visiting the site (e.g., to pick up and/or drop off cargo, to collect garbage, to repair or otherwise access a device or utility at the site, etc.), an expected length of time the driver is to remain at the site, additional sites to be included in the route, the amount of time the driver is driving within a time period, the amount of time the driver is working (e.g., driving, loading or unloading cargo, etc.), a skill of the driver, a time of day, and a set of traffic patterns, etc.

At block 606, the routing module 200 accesses site details information associated with the site. This information may be accessed from one or more of the site details repository 142, fleet data repository 144, and third-party repository 146. Further, the site details information may include any information that enables identification of site locations within the site, gates that allow entering or exiting the site, gates that may exist within the site, hours of operation of the site or of site locations included in the site, any restrictions relating to access of the site for the site locations, and drivable paths within the site. In some embodiments, the site details information may include one or more maps of the site or its site locations. Moreover, in some embodiments, the site details information may include the identity of previously defined access paths. Further, in some implementations, the site details information may be associated with particular vehicle fleets or entities. In such cases, the block 606 may include accessing the site details information associated with the vehicle fleet or the entity of the user that selected the site at the block 602.

The routing module 200, at block 608, selects an access path at the site based on the context information in the site details information. For example, the context information identifies a vehicle as being a refrigerated truck, access path may be selected that leads to a refrigerated loading dock. However, if the context information identifies the vehicle is carrying dry goods, and access path may be selected that leads to a different loading dock, such as a non-refrigerated loading dock. As another example, if the vehicle is identified as exceeding a particular weight or height, a different access path may be selected than if the vehicle does not exceed the particular weight or height.

In some embodiments, the block 608 may include defining an access path. In some cases, the block 608 may include presenting the access path to the user for confirmation. Moreover, the block 608 may include selecting and/or defining multiple access paths and presenting the access paths to the user for selection. In some cases these access paths may be ranked or prioritized by the vehicle management system 150 based on the context information.

At block 610, the vehicle management system 150 determines a location of the vehicle. In some cases, the block 610 may include selecting a vehicle from a vehicle fleet and/or a driver who is available to drive to the site. Selection of the vehicle and/or driver may be based on the context information determined at the block 604.

The routing module 200, at block 612, calculates a route on a network of streets, or a road network, between a location of the vehicle and a start of the access path. Further, the route calculated may include the entirety of the access path. The route may be calculated using any type of route calculation algorithm including those previously described. Further, the block 612 may include one or more of the embodiments previously described with respect to the block 310.

Similarly to the process 300, the process 600 may be used to calculate a route that includes multiple access paths. Each of these access paths may be selected based on context information. Alternatively, some of the access paths may be user selected while others may be selected based on context information. Further, similar to the process 300, the process 600 may be used for selecting access paths when a route is being calculated for multiple stops or sites. In addition, the process 600 may be adapted for use in selecting access paths between sites as described above with respect to the process 300. For example, a user may select a starting site or location and an ending site or location, and the vehicle management system 150, using the process 600, may automatically determine an access path between the sites in order to ensure that the driver drives to a particular location and/or avoid striving through particular location (e.g., Philadelphia).

In some embodiments, a user may be presented with an opportunity to override the selection of an access path. Further, the user may provide a reason for overriding the selection of an access path. The provided reason may then be used to modify the selection of the access path for future users. For example, the user may override the selected access path and may indicate that construction or an accident makes the selected access path less desirable. The routing module 200 may then avoid use of this access path when generating routes for other drivers. In some cases, the reason may be time-limited (e.g., when the reason relates to traffic), and after a period of time the rejected access path may be used again when generating a route.

The routing module 200 may, in some cases, infer an access path and/or a portion of an access path. For instance, the block 608 may include inferring an access path based on context information that can include an identified route. This identified route may be a route selected by a user, such as the driver, before beginning a route or while traversing a route. Alternatively, or in addition, the identified route may automatically be determined based at least in part on a detected route traversed by the vehicle and, in some cases, based at least in part on the selected destination and/or other context information. Once a route has been identified, or as part of identifying the route, the routing module 200 may infer an access path for directing the driver to a location within the target site. For example, suppose that a refrigerated vehicle delivers cargo to a particular dock at a site and that there is a first access path that is between an East entrance to the site and the particular dock and a second access path that is between a West entrance to the site and the particular dock. Based at least in part on the determination of whether the identified route leads to the East or to the West entrance, the first or second access path may be inferred or selected for directing the driver to the particular dock.

As a second example, suppose that two different vehicles are travelling two different routes that end with the vehicles arriving at the East entrance. Based on the routes travelled by the two vehicles, it may be inferred that one vehicle is carrying a particular cargo and consequently, a particular access path may be selected to direct the vehicle to a particular loading dock, and it may be inferred that the other vehicle is carrying different cargo and consequently, another access path may be selected to direct the vehicle to another location within the site.

In some implementations, a portion of an existing access path may be inferred. The portion may include the start of the access path, the end of the access path, or an extension of the access path. Further, the portion of the access path may be inferred based at least in part on a number of factors including: another portion of the access path that the vehicle travelled or that has been identified by the routing module 200; context information associated with the vehicle (e.g., vehicle type, cargo type, an entity associated with the vehicle, etc.); a route or portion thereof travelled by a vehicle or identified for travel by the vehicle; and the like.

In embodiments where multiple sites are identified, the process 600 may include defining the route and selecting access paths to reduce the amount of time a driver is waiting at a particular location. In certain embodiments, the wait time may be reduced by determining when other drivers will be at a particular site location (e.g. a refrigerated loading dock). In certain embodiments, by accessing the fleet data repository 144, the vehicle management system 150 can determine when drivers of other vehicle fleets are accessing the site.

In addition, the route may be generated such that the driver is at a particular location when the route ends or when it is time for the driver to take a break. Advantageously, in certain embodiments, by defining the route so that the driver is at a particular location at a particular time, the drivers mealtimes and resting times can be all aligned with when the driver is at an optimal location for taking a meal break or a sleeping break. In other words, the route can be defined so that the driver is near a restaurant when it is time for a meal break or is near a location where it is permissible for the driver to stop the vehicle and sleep, such as at a site the permits drivers to sleep in the parking lot. Further, the route may be defined based on the condition of the vehicle. For example, if an in-vehicle device 105 indicates that the vehicle will need gas at a particular time or needs to stop for maintenance, the route can be calculated such that the vehicle is near a gas station or a repair station at a particular point in time.

In some embodiments, the process 600 can include selecting multiple potential access paths and calculating multiple potential routes to determine the combination of access paths and routes that provide a lowest-cost solution. In many cases, the routing module 200 can select a single access path based on context information, such as a type of cargo carried by a driver's vehicle, and generate an optimal route, or a lowest-cost route, that includes the access path. However, when attempting to schedule a route for a driver that includes a number of sites and/or site locations, it may be necessary to compare the cost of different routes to determine not only the access paths and route that result in the lowest-cost, but also the order in which sites and site locations should be visited to minimize cost (e.g., time, fuel use, distance traveled, etc.). In such cases, the routing module 200 may select one or more access paths associated with each site to be visited and may generate a number of routes based on different selected access paths in an attempt to determine a combination of access paths, site ordering, and routes between sites that result in a lowest-cost solution. Thus, in some cases, an access path that is optimal when a driver is visiting a single location, may be less cost-efficient if the driver is visiting multiple locations because, for example, the approach to the site may change when the driver is approaching the site from a previous site rather than from the vehicle fleet yard.

Access paths may be selected both for approaching a site or site location as well as for leaving the site or site location.

In some cases, the access path selected to approach the site may differ from the access path selected to leave the site. For instance, the routing module 200 may select an access path that uses an eastern gate to enter the site, but may select an access path that uses a western gate to leave the site because, for example, it may be easier than turning the vehicle around or it may facilitate generating a route to a second site.

In some embodiments, the routing module 200 may output a cost of a route in addition to or instead of outputting the route to the user. In some such cases, the user may select a route from a number of routes based on costs presented by the routing module 200. The routing module 200 may then output the selected route to the user and/or may provide routing information to another device, such as an in-vehicle device 105, which may then guide the driver along the route.

In some embodiments, the process 300 and the process 600 can be combined to enable a user to test different route options. For example, using the process 300, a user may select one or more access paths with respect to one or more sites in a planned itinerary. The user may then use the process 600 to complete determination of the route for the entire itinerary and/or to determine the cost of traveling to each site in the itinerary. Once the user has determine the costs for the route generated as a combination of access path selected by the user and access paths routes calculated by the routing module 200, the user can repeat the process with a different set of user selected access paths an automated route calculations. Advantageously, the user can then use the costs or routes calculated to compare different access path selections. The user may then use the comparison to decide which access paths the user prefers. Alternatively, the user may decide to have the routing module 200 and/or calculate entire route without user input with regards to selecting an access path or route. Advantageously, by combining the process 300 and the process 600, a user can determine whether selecting a preferred access path for one site will negatively affect the cost calculation for routing to or from additional sites. Further, in some cases, the automated access path selection features of the routing module 200 may be tested by comparing the output generated by using the process 600 within output generated by using the process 300 using access path selections that the user knows to be optimal with respect to selected cost criteria.

In some embodiments, a user (e.g., a dispatcher or administrator) may use the process 600 with a number of different site itineraries to automatically determine the route for each of the drivers for which the user is responsible for assigning routes. In some cases, the user may provide the routing module 200 and the identity of every site to be visited and any additional context information that may be required for cockfighting the routes, such as there are particular time constraints and visiting a particular site or if certain sites need to be visited in a particular order because, for example, cargo must be obtained from one site for visiting another site where the cargo will be dropped off. Once the routing module 200 has an identity of the sites in any additional context information, the routing module 200 may use the process 600 to automatically calculate one or more routes for one or more drivers.

The process 600, and the process 300, have generally been described as having a user access the routing module 200, which may be part of the vehicle management system 154 or which may be a separate system. In some cases, the user may access the routing module 200 directly or via a management device 135. However, in other cases, the vehicle management system 150 or the routing module 200 may be accessed via another system by the use of an exposed application programmer interface (API). Furthermore, in some cases, the vehicle management system 150 may be maintained by a separate entity than the vehicle fleet entity or an entity that utilizes the vehicle management system 150 for route determination.

Crowd-Source Based Access Path Generation Process

Figure 7:
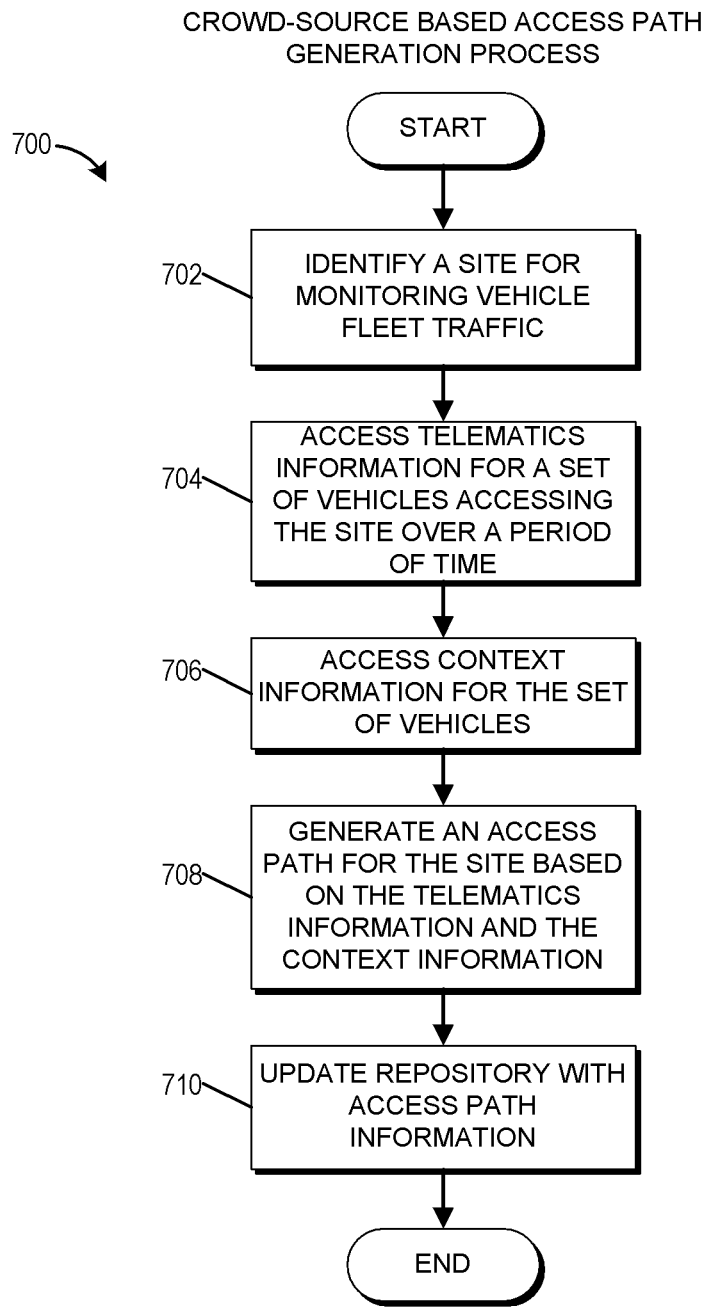
FIG. 7 illustrates a crowd-source based access path generation process.

FIG. 7 illustrates a crowd-source based access path generation process 700. The process 700 can be implemented by any system that can monitor the routes driven by a set of vehicles over a period of time and use the collected information to update or define an access path. For example, the process 700, in whole or in part, can be implemented by a vehicle management system 150, one or more in-vehicle devices 105, a routing module 200, and access path selection module 250, or a route calculation module 225, to name a few. Although any number of systems, in whole or in part, can implement the process 700, to simplify the discussion, portions of the process 700 will be described with reference to particular systems.

The process 700 begins at block 702 where, for example, the vehicle management system 150 identifies a site for monitoring vehicle fleet traffic. The site may be identified by a user or may be automatically identified by monitoring vehicle traffic of vehicles equipped with one or more in-vehicle devices 105.

At block 704, the vehicle management system 150 accesses telematics information for a set of vehicles that access the site over a period of time. The set of vehicles may be associated with a particular vehicle fleet or a number of vehicle fleets that are subscribed to services provided by an entity control of the vehicle management system 150. In addition, the set of vehicles may share one or more characteristics. For example, all of the vehicles may include a refrigerated cargo area, have eighteen wheels, exceed ten feet in height, have the steering wheel on the side opposite to the standard side for the country (e.g., some postal vehicles), include sleeping areas in the cab, include cargo areas that may be separated from the cab, etc. The period of time may be defined by a user (e.g., an administrator or a dispatch operator). Further, in some cases, the period of time may be continuously shifting window of time. In some implementations there may not exist a defined period of time, but instead the process 700 may be performed continuously or on an intermittent basis.

At block 706, the vehicle management system 150 accesses context information for each of the set of vehicles. This context information may be accessed from the parameter data repository 240. Alternatively, or in addition, the context information may be accessed from one or more in-vehicle devices 105. This context information may include any type of information that can be used to identify the type of vehicle or purpose of the vehicle at the site. For example, the context information may include an identity of the vehicle type, the vehicle fleet to which the vehicle belongs, cargo carried by the vehicle, site permissions granted to the vehicle or a driver of the vehicle, etc. In some implementations, or for some sites, the operations associated with the block 706 may be optional.

At block 708, the access path selection module 250 generates an access path for the site based at least in part on the telematics information and the context information. In embodiments where the block 706 is omitted, the access path may be generated without regard to the context information. In some cases, the block 708 may include updating or modifying an existing access path for the site. Further, the block 708 may include generating an additional access path for the site, which may be for the same site location is an existing access path or for a different site location.

At block 710, the vehicle management system 158 updates a repository with access path information. Updating the repository may include adding the identity of a new access path or modifying an existing access path for the site. In some cases, the block 710 may include updating the site details repository 142 and/or the fleet data repository 144. In some embodiments, the access path may be generated based on information associated with a particular vehicle fleet. In such embodiments, the access path may be added to a repository that is accessible by users of the particular vehicle fleet, but not other users. In some such cases, the vehicle management system 150 may present an option to a user to add the new access path to a repository that is accessible by users affiliated with another entity or vehicle fleet. Thus, for example, an entity without a history of accessing a particular site may obtain access path information for the particular site thereby enabling the entity to take advantage of information collected by other vehicle fleets.

Advantageously, the process 700 enables the determination of a preferred route within a site. For example, using the process 700, it may be determined that vehicles with refrigerated cargo usually access a particular loading dock (e.g., a refrigerated loading dock) at a site. Further, it may be determined that vehicles typically access a particular gate and drive a particular path between the gate and the particular loading dock. Using this information, an access path may be defined for vehicles with refrigerated cargo that leads from the particular gate to the particular loading dock. This access path may then be selected and a route may be calculated based on this selected access path each time a driver is assigned to carry refrigerated cargo to the site. However, when non-refrigerated cargo is to be delivered to the site, a different access path and route may be calculated.

In certain embodiments, the process 700 may be used to determine access paths that are external to a site. In other words, the process 700 may be used to determine preferred routes between sites that are preferred by drivers, but are not necessarily the lowest-cost routes.

In some embodiments, in addition to or instead of using information collected at the block 704 and the context information accessed at block 706 for generating access paths, the collected information in the context information may be used to facilitate assigning drivers to a route or scheduling the order that sites are accessed. For example, if it is determined that the average driver spends 30 minutes at a location, but a particular driver tends to spend an hour, the particular driver may not be assigned to the route. Conversely, if the particular driver spends 15 minutes at the location, a dispatcher may attempt to sign a route that includes the location to the particular driver. Thus, in some cases, the process 700 may be used for data mining instead of or in addition to crowdsourcing so as to determine the best employees for a particular job or route.

Sharing Site Detail Information

As previously stated, in some embodiments, users or entities can share the information they gather relating to sites that their drivers visit. Advantageously, in certain embodiments, by sharing gathered information, new access paths can be discovered and in some cases, access paths can be determined for sites that drivers associate with an entity have not previously visited. When sharing information associated with a site, a user can determine whether to share all information pertaining to a site, a portion of the information, and with whom or with which entities to share the information. Advantageously, the ability to share site details information allows users to crowd source information about different sites. The information that can be crowd sourced for the sites is not limited and can include suggested or preferred access paths as well as the identification of site locations, such as loading docks, receiving entrances, gates, dumpster locations, the types of vehicles that can use a particular gate, etc. Further, information relating to accessing a site may also be crowd sourced, such as security information, gate access restrictions, times that a site is open for deliveries or to the public, whether drivers can stay overnight at the location, etc.

FIGS. 8A-8F illustrate an example of sharing fleet-specific site detail information. To simplify discussion, the site detail information in the example associated with FIGS. 8A-8F will be described as being associated with user Joe and user Pete. However, it should be understood that the site detail information may be associated with particular entities and a number of authorized users associated with the entity may access the site detail information or a subset thereof.

Figure 8A:
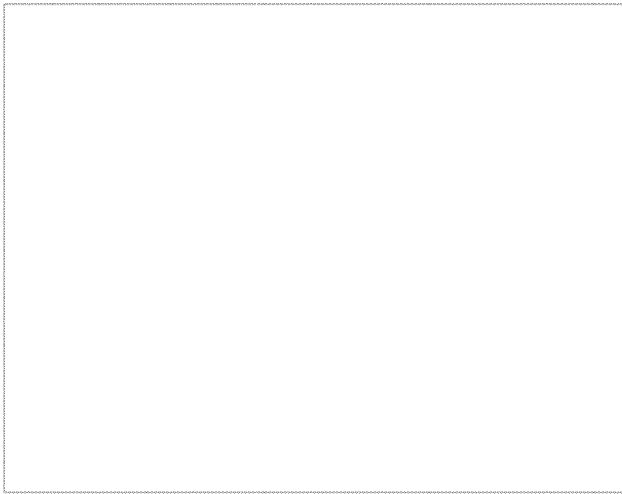
FIGS. 8A-8F illustrate an example of sharing fleet-specific site detail information.
Figure 8A:
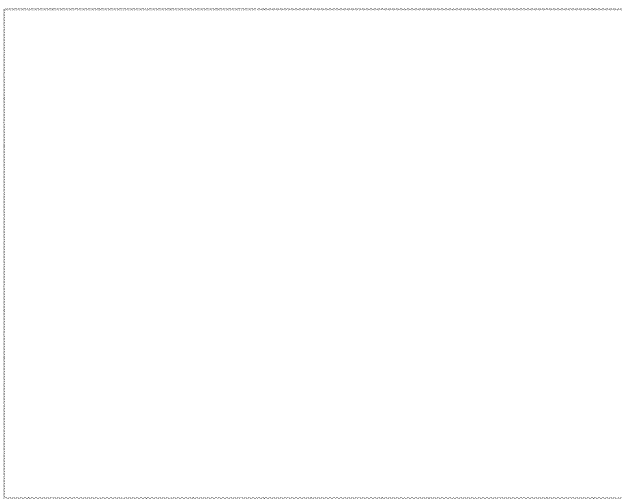
Figure 8A:
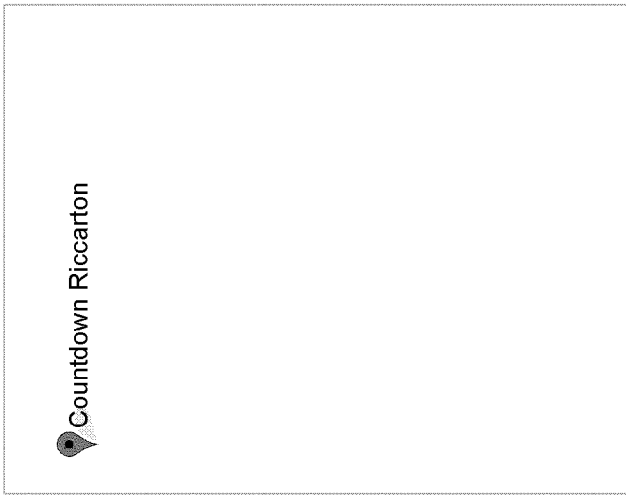

In FIG. 8A, Joe creates and entry in the fleet data repository 144 for a supermarket site, Countdown Riccarton. This site may include a number of site locations. For example, the supermarket may include outdoor parking, a parking garage, one or more loading docks, a dumpster location, a water filling station, a gas station affiliated with the supermarket, etc.

Figure 8B:
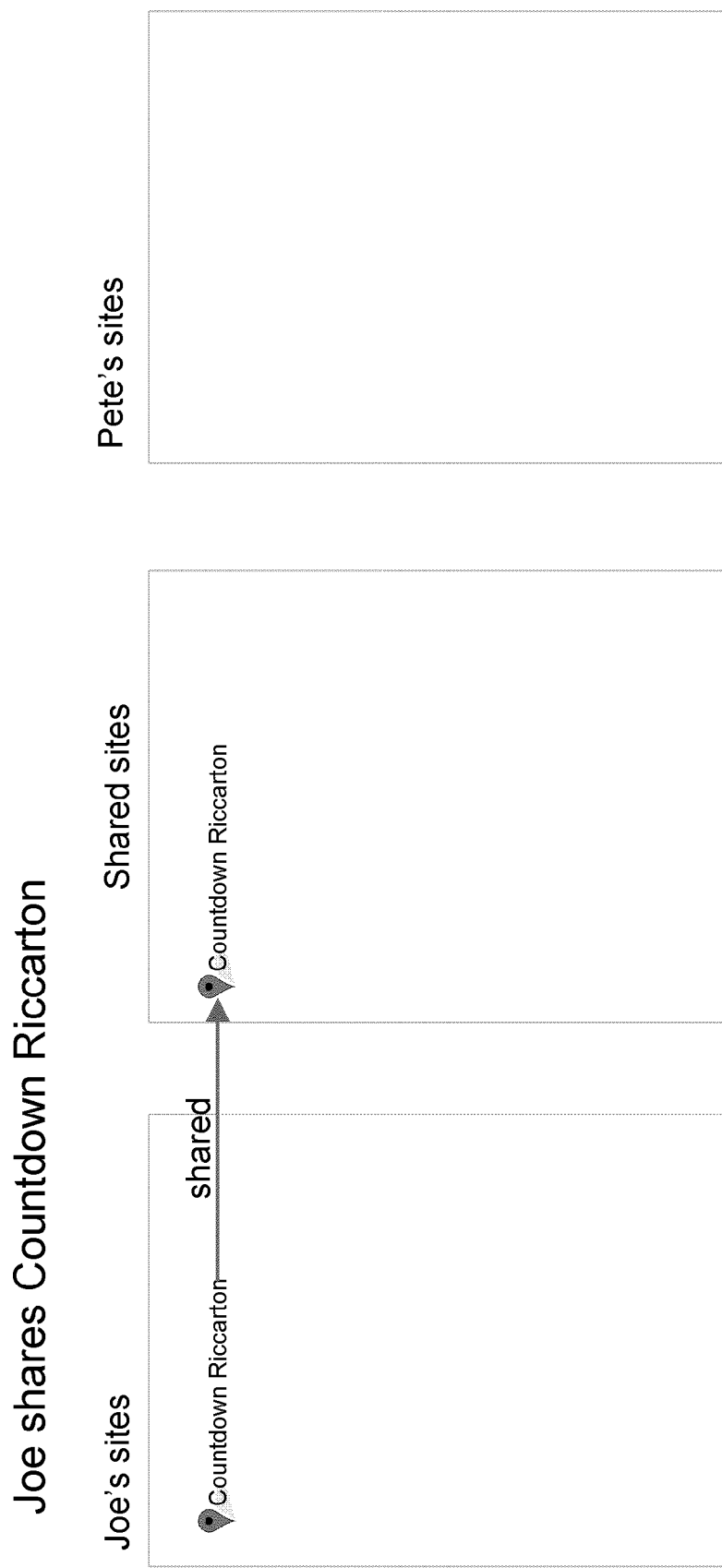

Joe may decide to share information gathered for the supermarket site Countdown Riccarton with other users or entities. The sharing of the site information is illustrated in FIG. 8B where Joe may provide an entry or database record associated with Countdown Riccarton to a site details repository 142, represented by the shared sites column in the figure, which can store information associated with sites to be shared among users or entities.

Figure 8C:
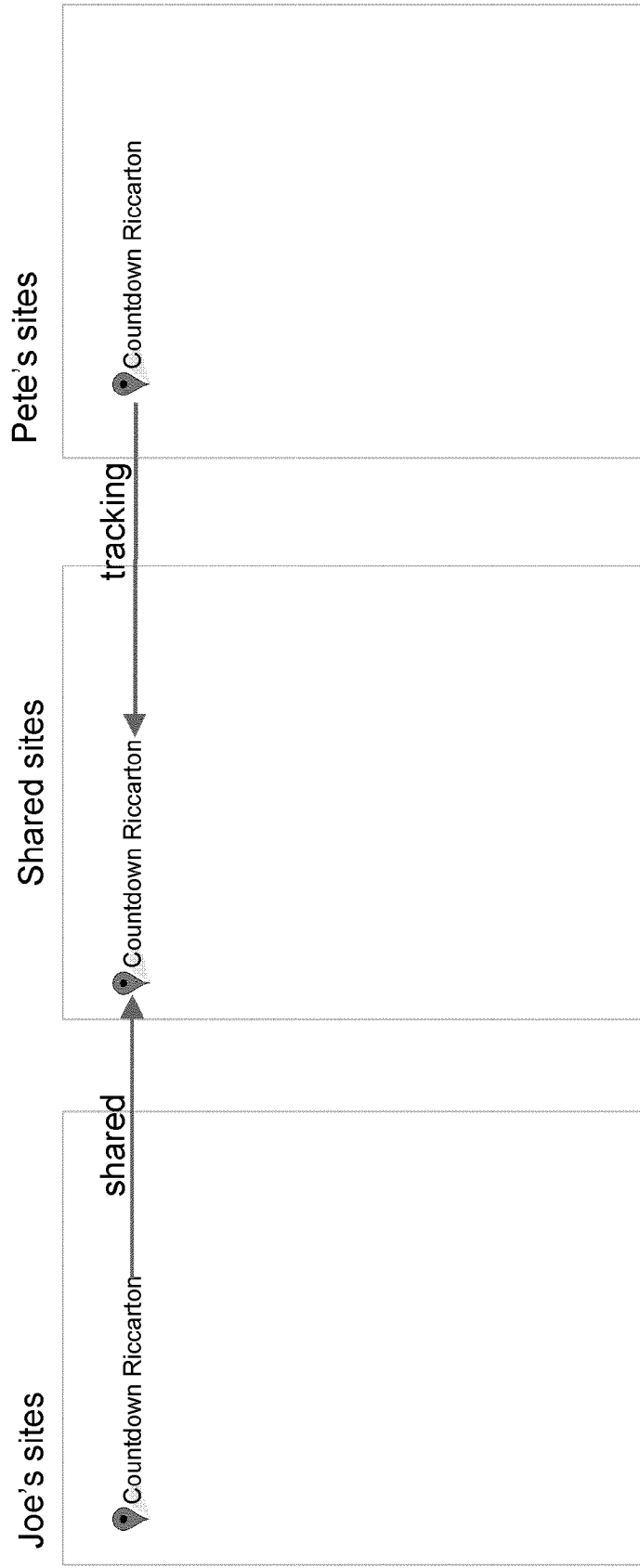

As illustrated in FIG. 8C, Pete may decide to access the site information associated with Countdown Riccarton. In some cases, Pete may view the information associated with Countdown Riccarton in the site details repository 142 without making a copy of the information. Alternatively, as illustrated in FIG. 8C, Pete may obtain a copy of the site details information for Countdown Riccarton and may store the copy in a fleet data repository 144 associated with Pete. Joe and Pete may each have access to a separate vehicle management system 150 and/or a separate fleet data repository 144. Alternatively, Joe and Pete may share the fleet data repository 144, but may each be associated with a separate portion of the fleet data repository 144.

In some embodiments, Pete may indicate a desire to track the Countdown Riccarton entry in the site details repository 142. By tracking the site entry, changes made to the site details for the site entry may be automatically copied to the corresponding entry in Pete's implementation of the fleet data repository 144. Alternatively, Pete may be made aware of modifications to the shared entry for the Countdown Riccarton site, but modifications may not be made to Pete's copy of the information without approval from Pete.

Figure 8D:
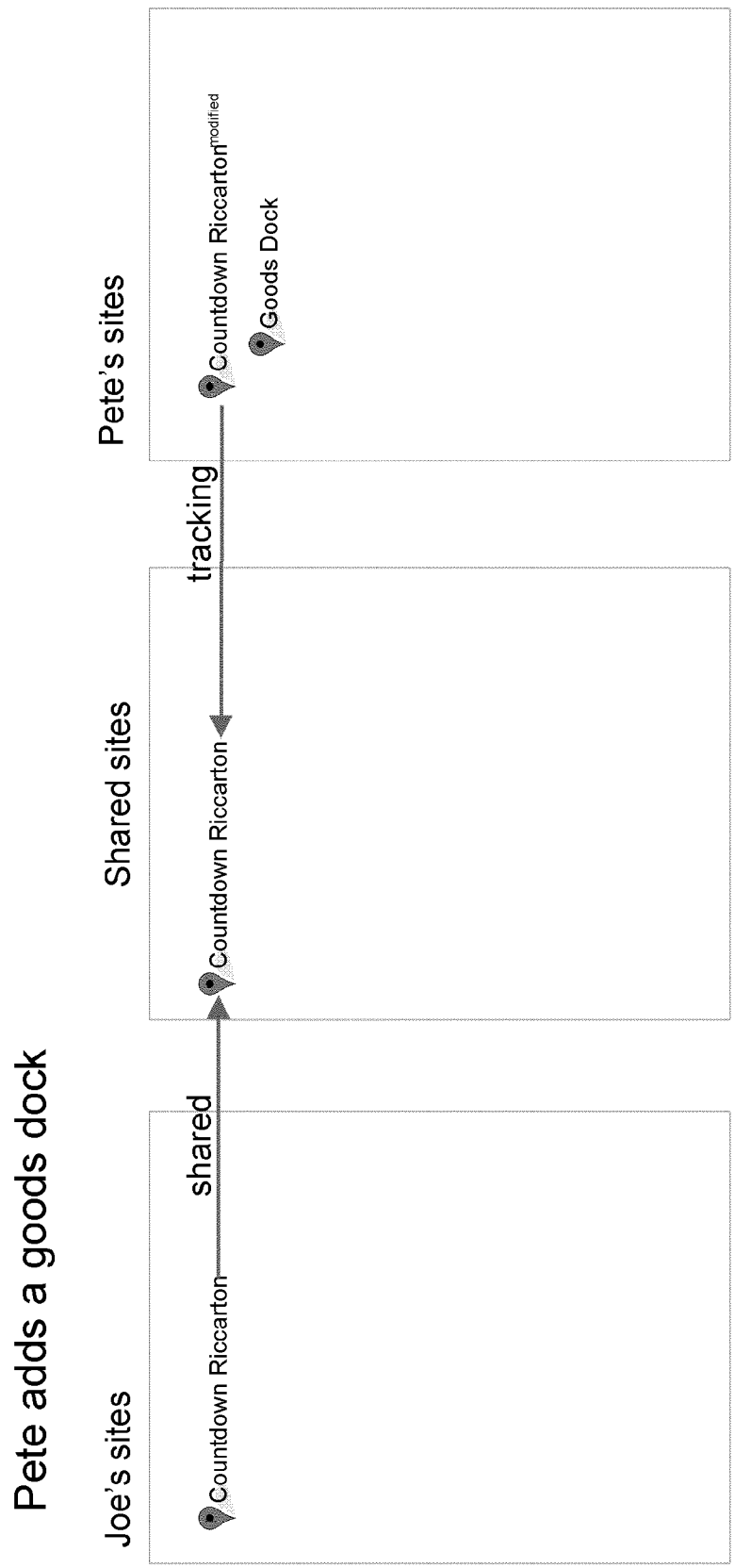

In FIG. 8D, Pete makes a modification to the copy of the site details information for Countdown Riccarton that is stored in the fleet data repository 144 associated with Pete. In the example illustrated in FIG. 8D, Pete adds the identification of a site location at the Countdown Riccarton site. In the illustrated example, the site location is a goods dock.

Figure 8E:
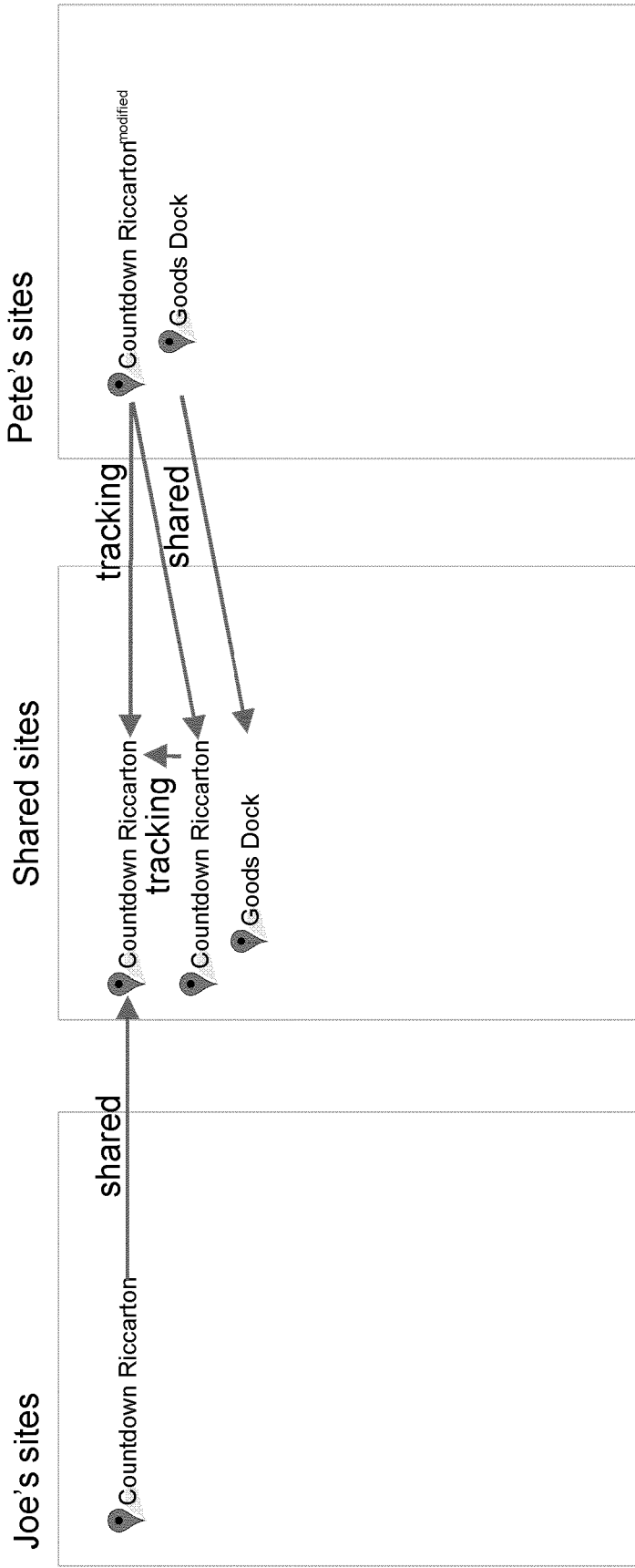
Figure 8F:
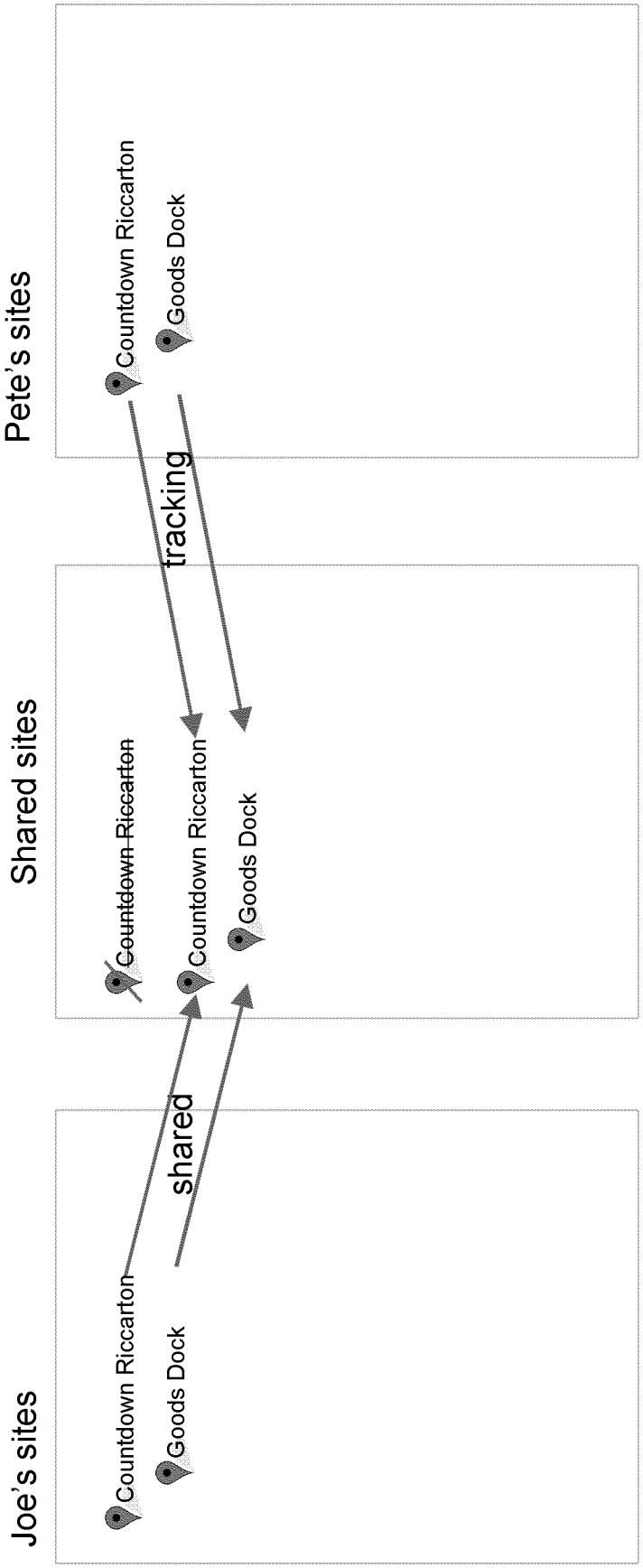

Once Pete has modified Pete's copy of the site details for Countdown Riccarton, Pete can decide to share the modifications with users who are tracking, following, or subscribed to the Countdown Riccarton entry at the site details repository 142. In some embodiments, modifications may automatically be provided to the site details repository 142. FIG. 8E illustrates that Pete's entry for the Countdown Riccarton at the fleet data repository 144 and the addition of the goods dock site location are shared with other users by providing the modified site entry to the site details repository 142. In some embodiments, the modifications to the Countdown Riccarton entry at the site details repository 142 are automatically updated. In other embodiments, the originator of the Countdown Riccarton entry at the site details repository 142 determines whether the modifications made by Pete will be accepted and whether the Countdown Riccarton can be updated with the modifications made by Pete. FIG. 8F illustrates an example where Joe has accepted the modifications to the Countdown Riccarton entry at the site details repository 142. In the illustrated example, the original Countdown Riccarton entry is replaced by the modified entry created by Pete at the site details repository 142. Further, Joe has updated the original Countdown Riccarton entry at Joe's fleet data repository 144. Thus, both Joe's and Pete's Countdown Riccarton entry at their respective fleet data repositories 144 now match.

In some embodiments, users (e.g., Joe and Pete) can make modifications to the Countdown Riccarton entry, or other site entries, in one or more fleet data repositories 144 without sharing the modifications. In some cases, users may share some modifications, but not others. Further, users who decide to share modifications can specify which users or entities have permission to access the modifications or site details information. Thus, for example, Pete may make a modification to the Countdown Riccarton entry and indicate that the modification may be shared with Joe, but not with a third user.

First Example of Creating Access Paths

FIGS. 9A-9G illustrate an example of creating an entry for a site 902 at, for example, a site details repository 142 or a fleet data repository 144. As will be described below, creating the entry may include creating an access path for the site. The site 902 may include any type of site. For example, the site 902 may be a supermarket, such as the Countdown Riccarton supermarket used in the previous examples with respect to FIGS. 8A-8F. FIG. 9 illustrates the site 902 with the geocoded marker for the site. This marker identifies the location of the site generally, but does not identify any specific details of the site or any site locations. FIGS. 9A-9G illustrate an example of top-down site creation. A user, such as Joe's Recycling or an employee thereof, may create and, in some cases, anonymously share the site 902 in a site details repository 142.

Figure 9A:
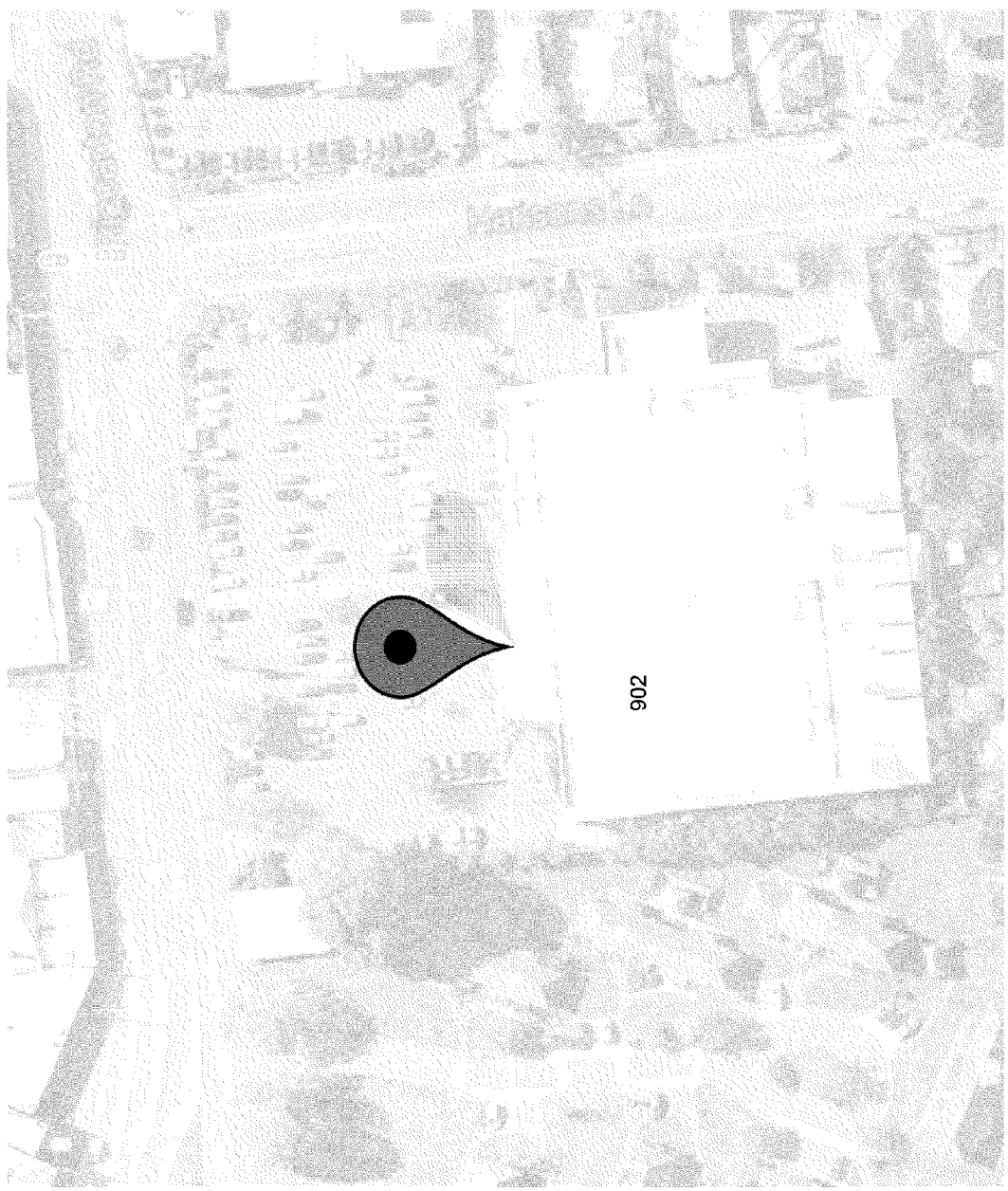
FIGS. 9A-9G illustrate an example of creating access paths for a site.
Figure 9B:
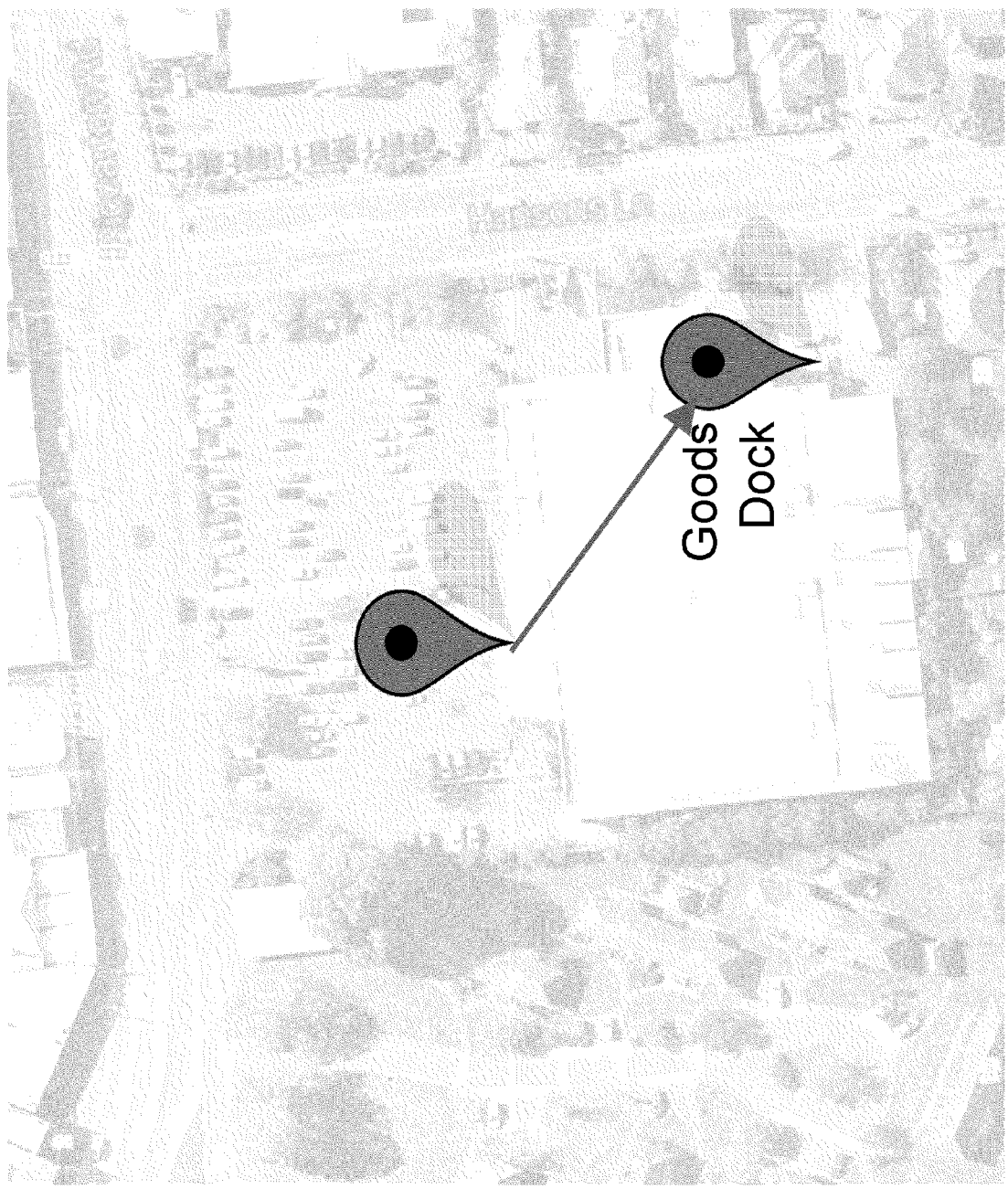

FIG. 9B illustrates the addition of a site location, goods dock, to the site 902. For example, Pete's Fresh Goods may have a job scheduled at the site 902. This job may include delivering fresh goods to the site 902. A user associated with Pete's Fresh Goods (e.g., a dispatcher) may subscribe to the existing site 902 at the site details repository 142. The user may then add the goods dock site location and share the changes. A user affiliated with Joe's Recycling may then be notified of the modifications and can decide whether to accept the modifications. If the user affiliated with Joe's recycling accepts the modifications, the shared entry associated with the site 902 at the site details repository 142 may be updated. If the user does not accept the modifications, the shared entry associated with the site 902 may not be updated, but a copy of the entry created by the user associated with Pete's fresh goods may maintain or include the modification.

Figure 9C:
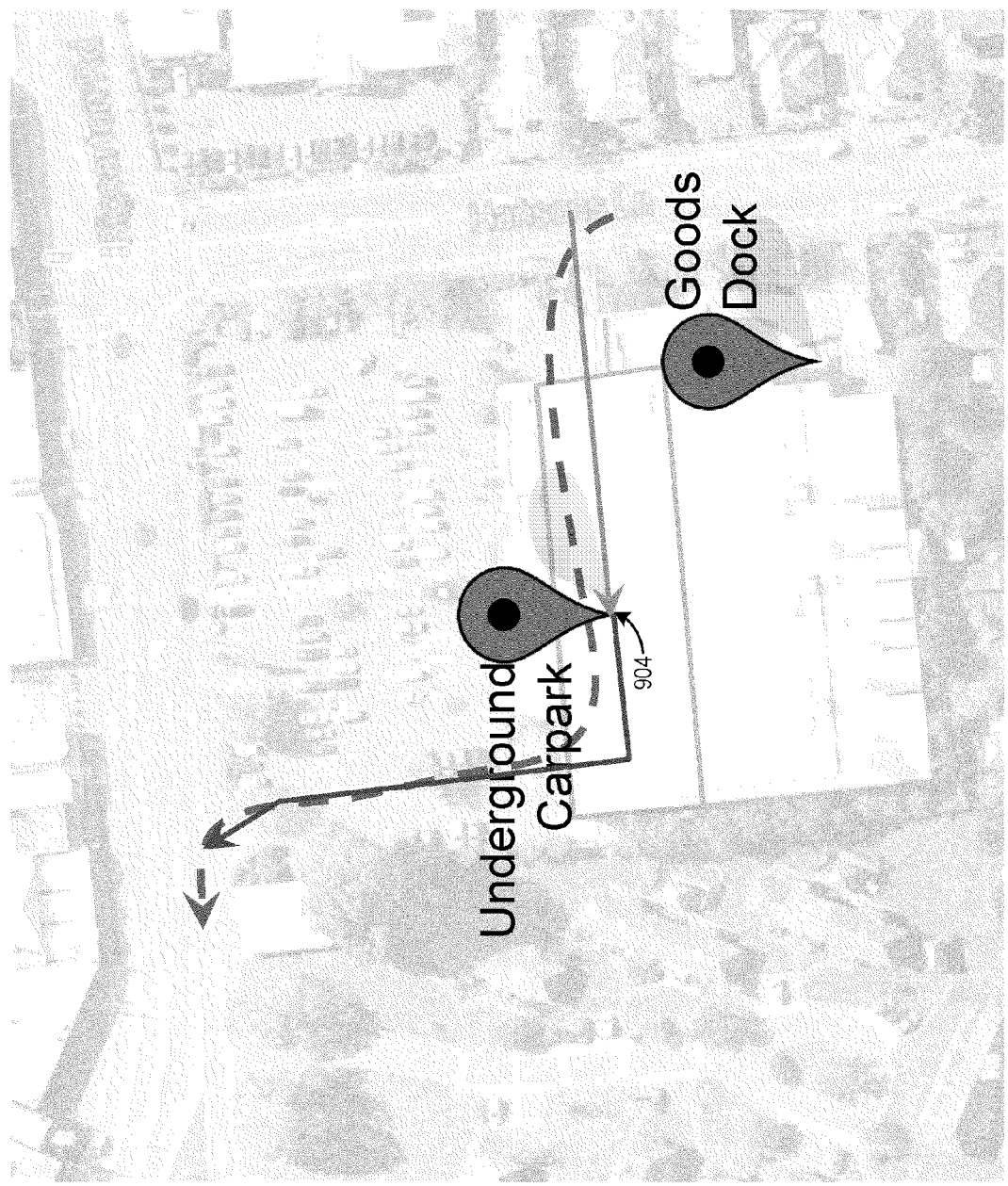

The user affiliated with Joe's Recycling may run a plan report versus an actual report comparing the planned driving routes with the routes actually taken by drivers. The user may notice that drivers typically enter from the east entrance and leave via the north exit rather than the east. The path that the majority of drivers affiliated with Joe's Recycling, or the majority of drivers being monitored by Joe's Recycling, is illustrated in FIG. 9C by the dashed line. One reason why a number of drivers may travel along the path dictated by the dashed lines is that recycling bins the site 902 may be located in the underground carpark. To facilitate generating routes to the east entrance through the site location of the underground carpark and out from the north entrance, a user may create a nested site using a polygon as illustrated in FIG. 9C to identify the site location 904 corresponding to the underground carpark. The user may then define approaches and departures to and from the site location 904. The defined approach and departure can be used as an access path and is represented by the solid line from the east entrance to the north exit. Although the access path illustrated in FIG. 9C begins from the eastern gate and ends at the northern gate, as previously described, access paths are not limited as such. For example, the access path can include one or more streets or roads of a road network that is external to the site 902. Moreover, although an access path will typically be a portion of a route, in some embodiments, the access path can encompass an entire route from one site to another site. Furthermore, in some cases, access path can encompass a portion of a route or an entire route between multiple sites (e.g., a route beginning at site 2, continuing to site 2, continuing to site 3, etc.).

Figure 9D:
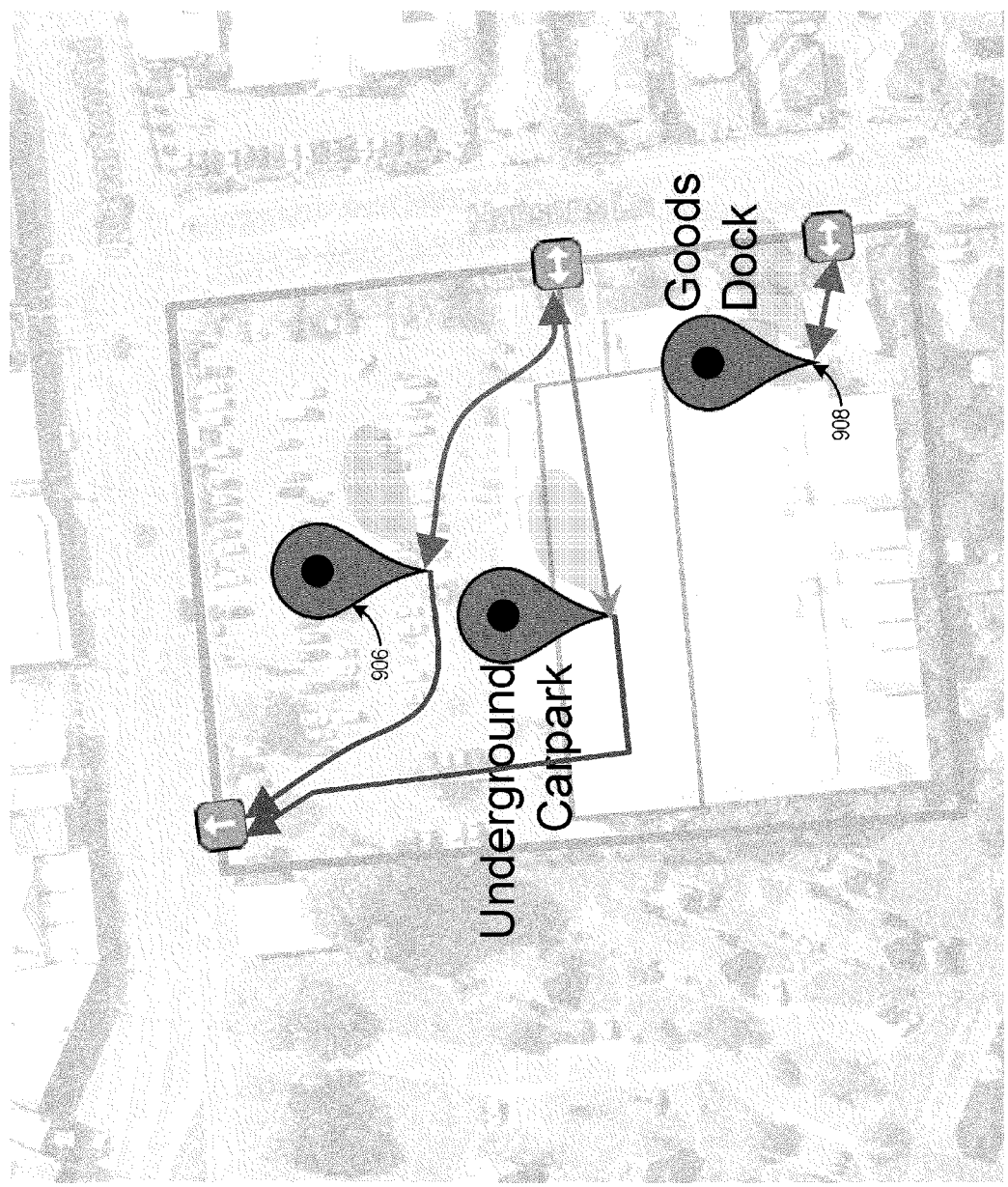

Continuing the example, and with reference to FIG. 9D, Pete's Fresh Goods may need to pick up goods from site 902. Depending on the type of vehicle the driver for Pete's Fresh Goods may sometimes park in the main parking lot corresponding to site location 906 or may use the goods entrance corresponding to site location 908. Thus, a user may desire to create multiple access paths, which can then be selected by the user or may be automatically selected by the routing module 200 based on context information, such as the cargo the driver is carrying for delivery to the site 902 or is picking up for distribution to another site. To accomplish the creation of the access paths, a user may create a polygon, or other annotation, on a map representative of the site 902 to identify the borders of the site. The user may also identify the gates corresponding to entrances and exits to the site 902. As can be seen in FIG. 9D, gates can be identified as bidirectional as with the gates on the east, or unidirectional as with the gates on the north of the site 902. The user can then generate access paths associated with the site. For example, as illustrated in FIG. 9D, an access path can be created between the lower eastern gate and the goods dock 908. This access path can be bidirectional leading either from the gate to the goods dock site location 908 or from the site location 908 to the gate. Another access path can be created between the upper Eastern gate and the main parking lot site location 906, and can then continue to the northern gate. This access path may be unidirectional as the northern gate may only allow for exiting traffic from the site 902. As previously described, the user may share modifications to the site 902, including the identification of access paths, with other users, such as Joe's recycling, which may be notified of the changes and may or may not be required to accept the changes before modifying a shared repository entry.

Figure 9E:
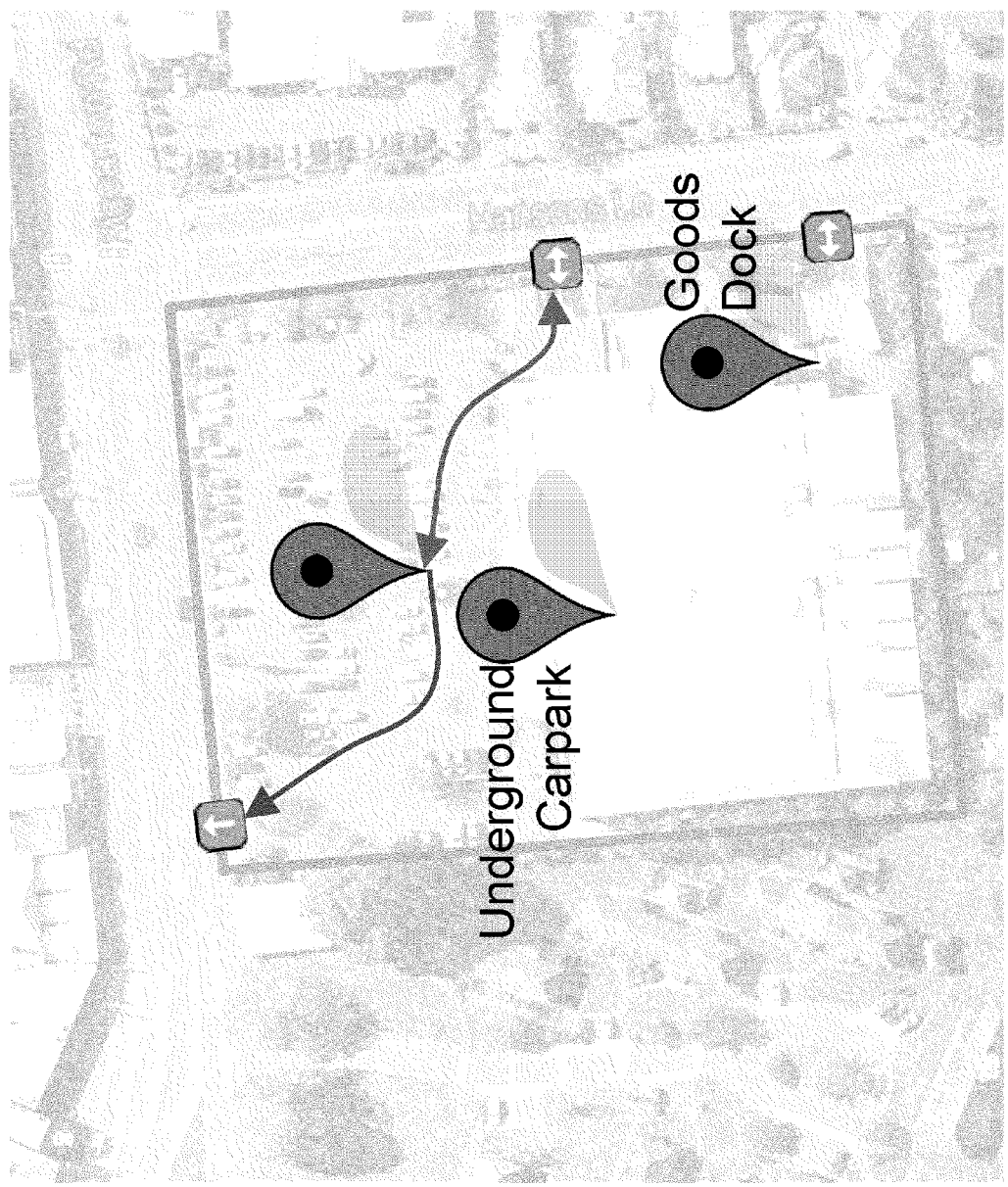

Some sites may include a number of site locations and annotations, and a number of different access paths may be generated, either by users or automatically by computing system. Viewing all of the access paths and annotations of a site user interface can be confusing. Thus, in some embodiments, the user interface can be configured to show only a portion of a site or only access paths and annotations associated with a subset of site locations. For example, as illustrated in FIG. 9E, it may be determined that the driver has a small delivery (e.g., one or two light boxes) or that the goods dock is scheduled to be occupied by other drivers. In such an example, it may be determined that the access path through the site location 906 is optimal for the small delivery. Thus, the access path that includes the site location 906 may be presented while other access paths and annotations may be hidden from the user, as illustrated in FIG. 9E.

Figure 9F:
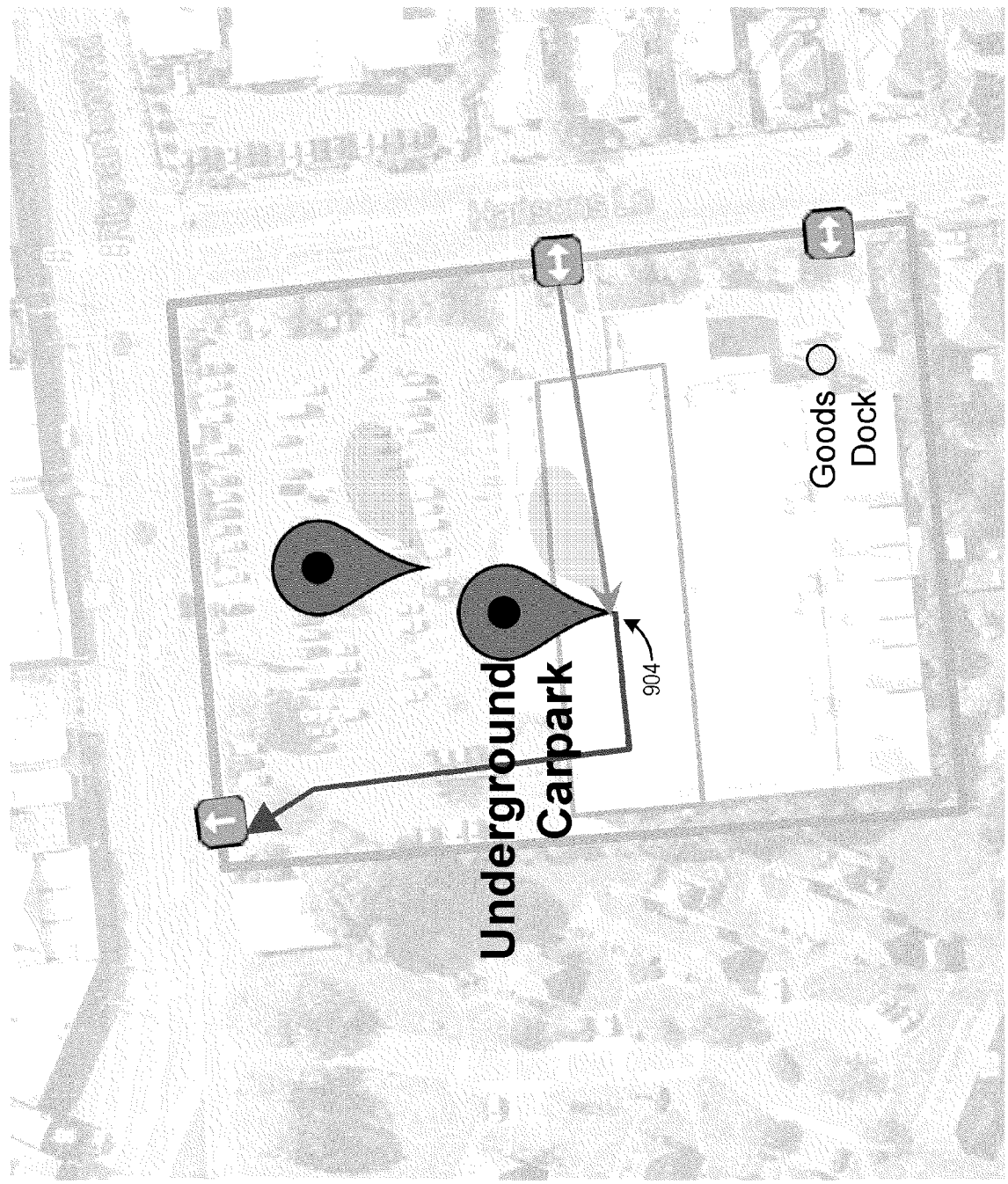
Figure 9G:
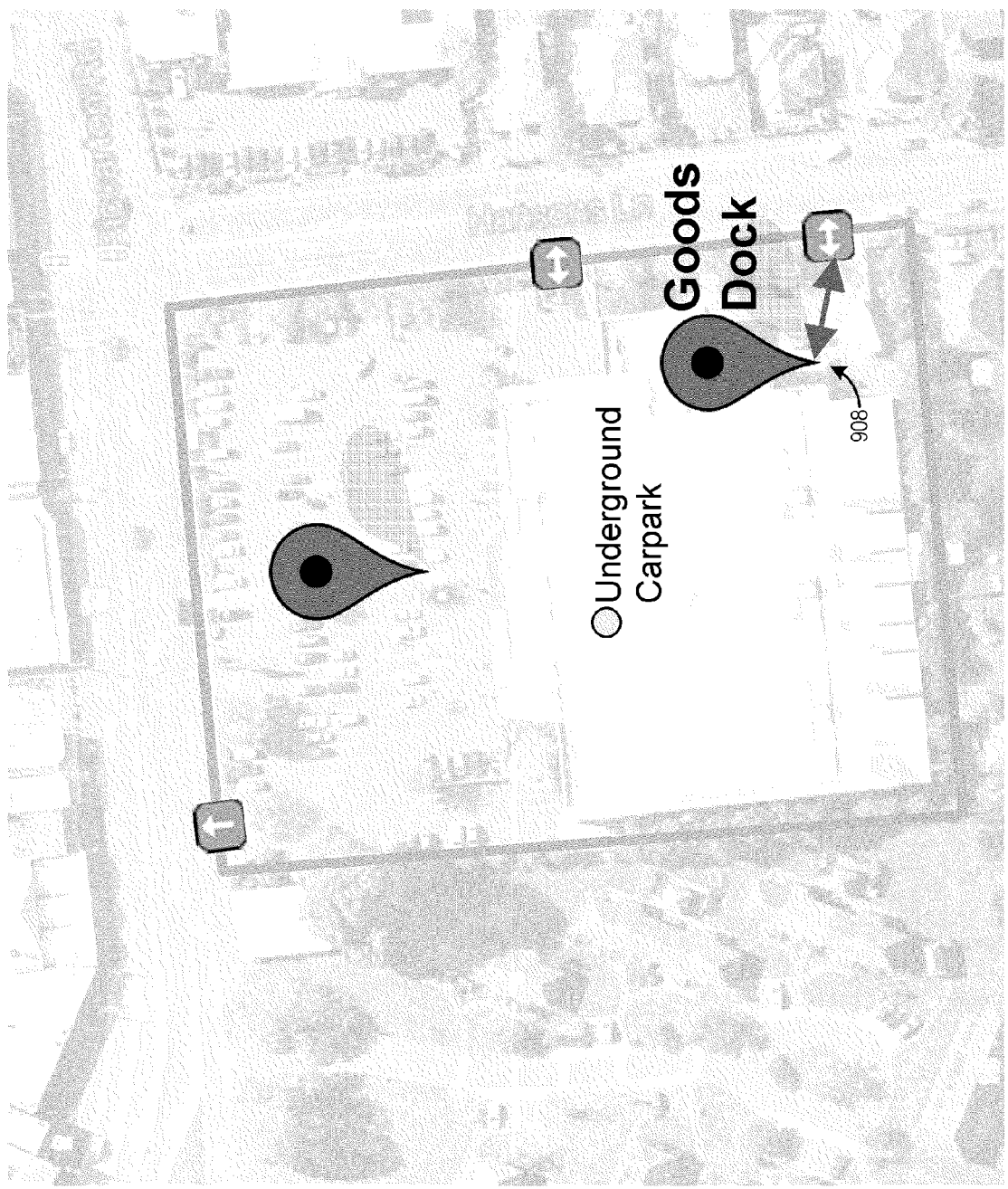

If the site location 904 corresponding to underground carpark is selected instead of the site location 906 corresponding to the main parking lot, the annotation or polygon surrounding the underground carpark may be displayed in the access path through the underground carpark may be illustrated as shown in FIG. 9F. Alternatively, if the site location 908 corresponding to the goods dock is selected, or if the routing module 200 determines that the driver should be directed to the goods dock-based, for example, on the cargo carried by the driver's vehicle, the access path leading from the lower eastern gate to the goods dock may be highlighted, while other access paths are hidden from view as illustrated in FIG. 9G.

Second Example of Creating Access Paths

Figure 10A:
FIGS. 10A-10J illustrate a second example of creating access paths for a site.

FIGS. 10A-10J illustrate a second example of annotating a site 1002 and sharing the annotations among users. The site 1002 may correspond to any site that includes a number of site locations that may be of interest to the user. For example, as illustrated in FIG. 10A, the site 1002 may include entrances to ten shops represented by the ten internal annotations, seven goods entrances for delivering inventory to the shops represented by the seven annotations on the border of the site 1002, and three gates for accessing or leaving the site 1002 represented by the annotations with the arrows indicating whether the gate is bidirectional or unidirectional. To identify the site 1002, a polygon may be drawn around the borders of the site 1002. This polygon may be drawn by a user or may be determined from site detail information, such as from a third-party repository 146, which may include information for identifying the border of a site (e.g., zoning information or property tax information).

Figure 10B:
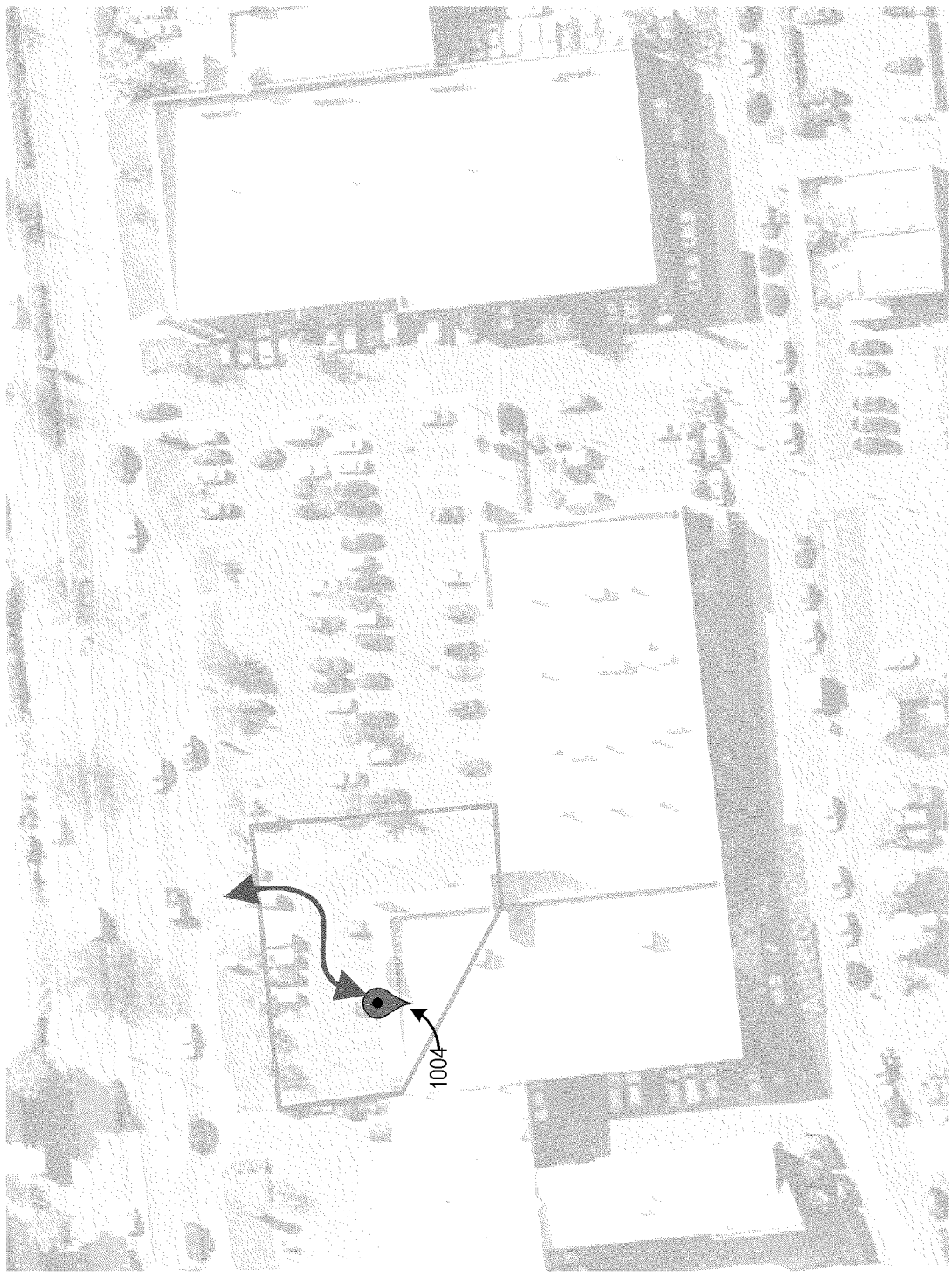
Figure 10C:
Figure 10D:
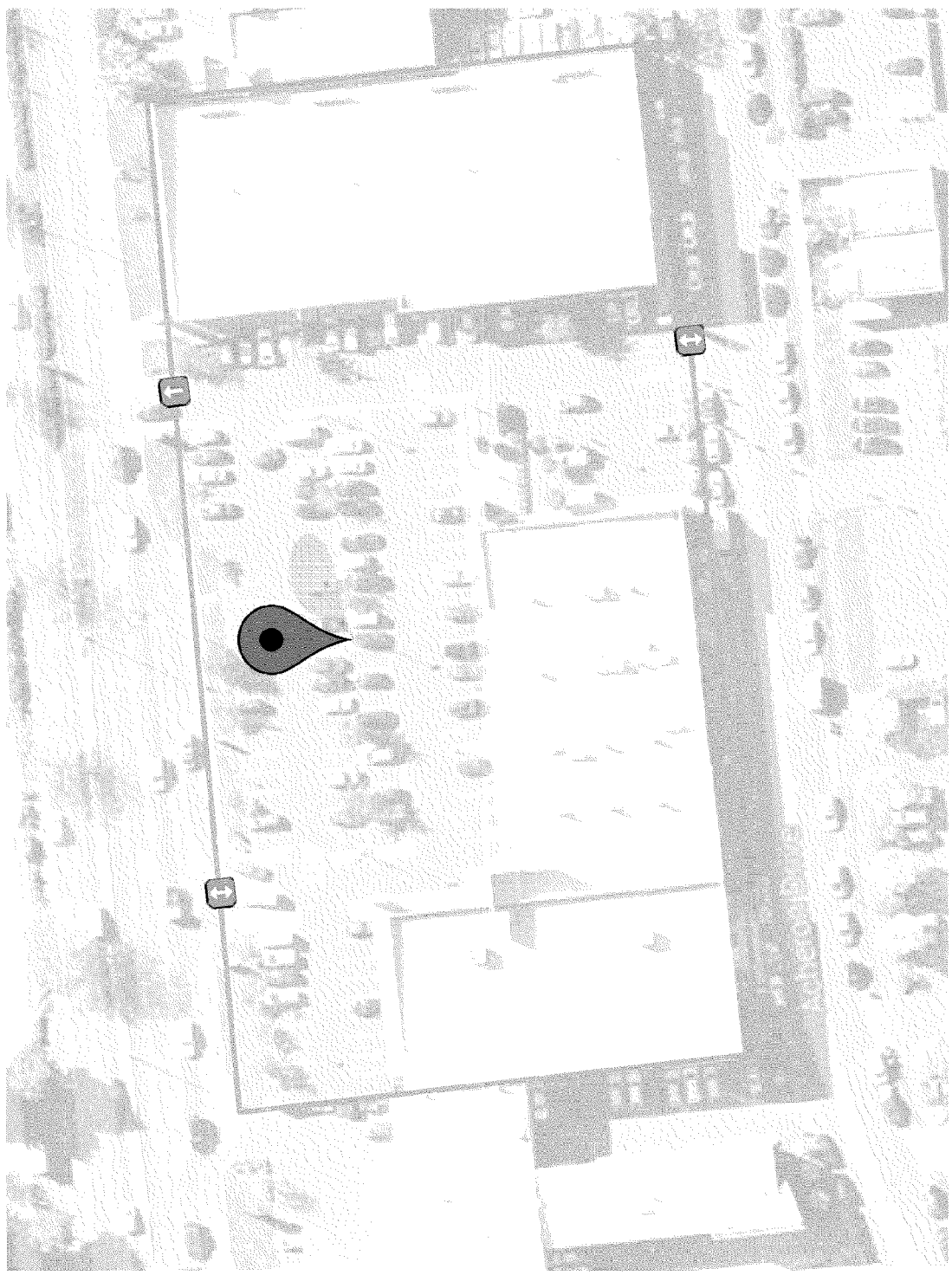

As illustrated in FIG. 10B, a user may identify a site location 1004, or a store, by attaching a polygon around the store 1004 (e.g., a stationery store) and/or annotating the location of the store. Further, this polygon may encompass an access path identified by the user for entering or exiting the site 1002. The site details created by the user may then be shared with other users or kept private. With reference to FIG. 10C, the user, or a second user, may create an annotation for another store 1006 (e.g., a home electronics store) and may also attach a goods entrance 1008 as a subsite for the site 1002. A third user may be employed to deliver to several of the stores in the site 1002. Thus, the third user may define a location to encompass the entire site 1002 as illustrated in FIG. 10D, which may include attaching a polygon around the entire site. Further, the third user may identify or define each of the gates is included as part of the site 1002.

Figure 10E:
Figure 10F:

A fourth user, illustrated in FIG. 10E, may subscribe to the site 1002, but may desire to navigate to individual stores. Thus, the fourth user may access shared site information for the site 1002 including the identification of the stationery store 1004 and the home electronics store 1006. The fourth user may add the shared annotations as subsites within the fourth user's copy of the site details information for the site 1002.

Figure 10G:

The fourth user may then select the home electronics store 1006 and inspect it. As illustrated in FIG. 10, selecting the home electronics store 1006 will include displaying the goods entrance 1008. Upon viewing the home electronics store 1006, the fourth user determines that the goods entrance 1008 is annotated as being located inside of the site 1002. In some such cases, because the goods entrance 1008 is annotated internally to the site 1002, a route generated to the goods entrance 1008 will include directing a driver through the southern gate and into the parking lot of the site 1002. However, the fourth user may desire to access the goods entrance 1008 from the street external to the site 1002. In such a case, the fourth user may add an access path 1010 that leads from the goods entrance 1008 directly to the street, as illustrated in FIG. 10G.

Figure 10H:
Figure 10I:

As illustrated in FIG. 10H, after adding the access path 1010, the fourth user may also select a stationery store 1004. Information associated with the home electronics store 1006 may then be hidden so that the user interface is not cluttered. The fourth user may decide that the access path from the door of the stationery store 1004 to the left northern gate is redundant and may delete it. Further, the fourth user may decide to add a goods entrance annotation 1012 to the stationery store 1004 and an access path 1014 between the goods entrance and the street. Modifications to the site location 1004 may be shared or may be kept private. If the modifications are shared, an owner or author of the site details associated with the site 1002 may decide whether to accept the modifications. In some cases, the modifications may be shared and accepted or may be kept as a separate entry associated with the site 1002. In cases where the site details information is shared, a user may decide whether to use site details information from any of the first user, the second user, the third user, or the fourth user. In some cases, a user may decide to use a combination of site details information supplied by different users.

Figure 10J:
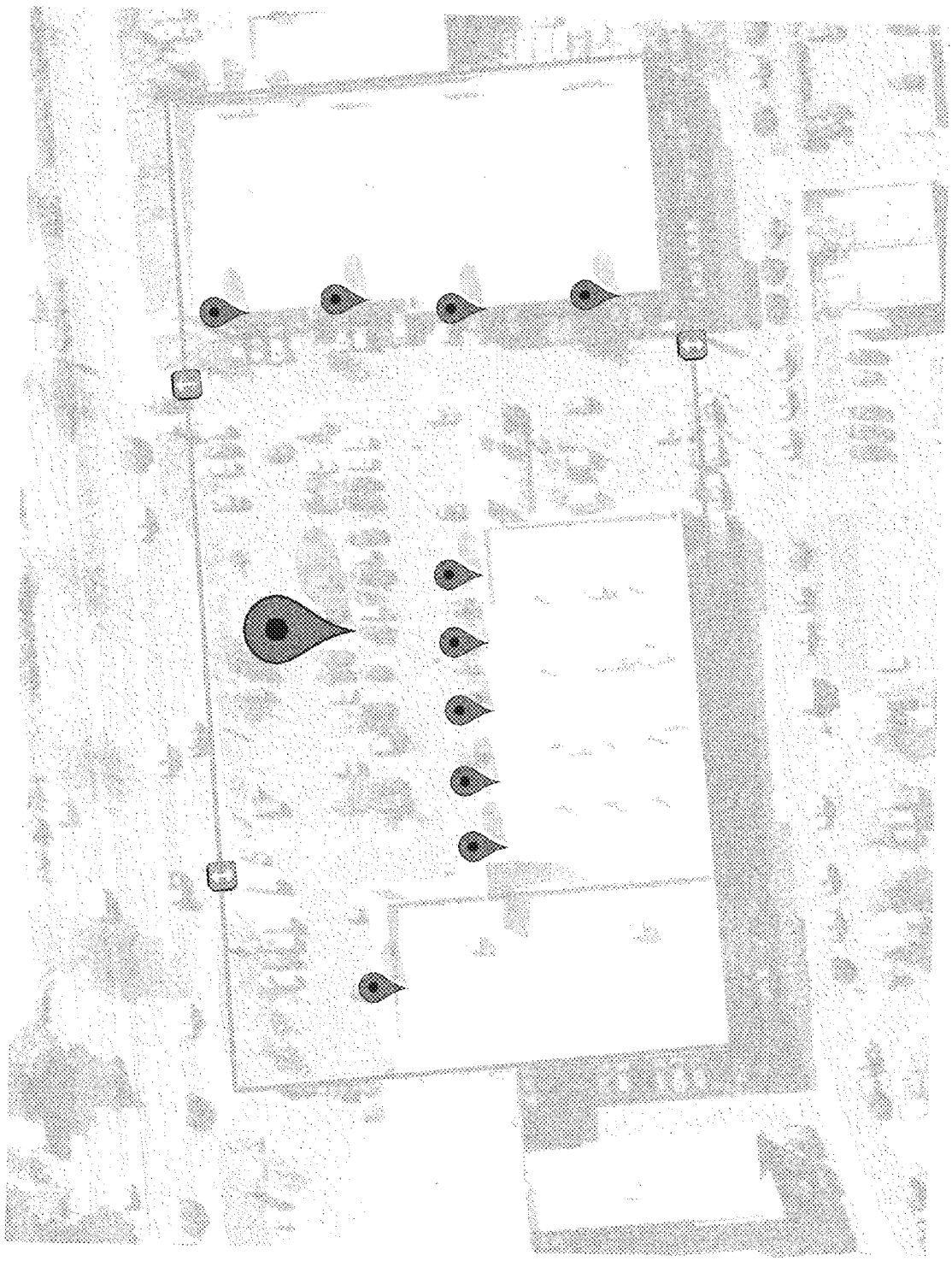

As illustrated in FIG. 10J, a user, such as the fourth user, a defined site locations for each of the other stores in the site 1002 that the user is interested in visiting. The user may then share the site information. Other users who have contributed site details information relating to the site locations that the fourth user has annotated may be notified of the fourth user's actions enabling other users to access any additional site details information.

Although many of the previous examples have been described from the perspective of enterprise users, such as drivers for entities or fleet dispatchers, should be recognize that the concepts disclosed herein may also be used by individuals. For example, one individual may define a preferred access path to a particular store and another individual access site details information for the particular store and may select a preferred access path for use in generating a route. Alternatively, a routing device of a user may automatically access shared information associated with an identified site to determine if any access paths have been identified that may be used in generating a route for the user who may be an individual or an enterprise user.

Advantageously, in certain embodiments, as can be seen from the previously described examples, users can share information relating to different points of interest or site locations within a site. Much of the description has been with respect sharing information related to access paths and points of entry or exit for both vehicles and cargo, such as gates and loading docks. However, this disclosure is not limited as such. The site details repository 142 in the fleet data repository 144 may be used to share additional information about sites or site locations. For example, information about when a site is open for access by a vehicle, whether there is a security checkpoint at a site, or whether drivers are permitted to sleep overnight in their vehicles at a particular site may be shared using embodiments described herein.

Additional Embodiments

In certain embodiments, a site may be defined in the systems described herein by the site details information associated with the site. This site details information may be stored as a hierarchy of data records in a database, or as any other data structure. Further, the site may be defined based on a number of different types of data including, for example, an address, a location, a yard, a gate, and approaches and destinations. The address may include one or more versions of the street address and associated metadata like its provenance, province, and accuracy. Locations may include one or more latitude and/or longitude points that are associated with the site. In some cases, a location may represent a point of ingress/egress to a site or building on that site and one of multiple destinations associated with that site, such as a specific loading dock or parking spot.

In some embodiments, yards may refer to zero or more boundaries that define areas associated with a site. Generally, there will not be navigable road data (e.g., from a NT basemap) within a yard. However, identifying the yard enables determining whether a vehicle is on-site, or to suspend navigation until the vehicle is back on the road network. The yard also prevents snapping to the wrong street at the end or beginning of navigation. In some cases, driving paths may include vectors for private roads, parking lots, etc., which may be useful for routing and navigation within a yard and to/from the yard.

Gates may include points of ingress or egress from a yard and are typically associated with the yard. In some cases, the gates may include point of ingress or egress from locations within the yard.

Approaches & Departures, which may be referred to as paths or driving paths, can include explicitly defined paths on the road network to or from a site (or location, or gate). Driving paths may also include vectors, useful for routing and navigation, that are not a part of the base map data. These driving paths may be referred to as off-network parts of the driving paths and may be attached to the base map routing network.

The site details information or data stored in reference to the sites may be used for a number of purposes. For example, the site details information may be used for rendering, forward geocoding, reverse geocoding, and routing. Rendering is in reference to visualizing sites on a map and enables display of features of the site, such as the yard, gates, locations, and driving paths.

Forward geocoding may include using the site details information when searching for an address or location to provide return information that is more spatially accurate and rich than general map data. Applications may choose to return the primary location or expose more data about a site and enable users to select a certain location on the site, such as a specific dock or gate, etc.

Reverse geocoding may be used in two different use cases. Reverse geocoding may be used to locate a known site. Instead of returning interpolated street address, the address of the site may be returned. Further, reverse geocoding may be used to learn more about a site. For instance, a user associated with a vehicle fleet may determine when a vehicle was in the yard, in a keep out location, at a specific dock etc.

Using site details information, routing can honor or conform to site properties when routing to or from a site. Further, the routing module can enable routing and navigation applications to direct drivers to the exact destination honoring preferences of the site "owner". These preferences may include things such as using the proper gate for entry/exit, routing certain vehicle types into/out of the site using specific roads, and days/times of operation.

In certain implementations, it may be determined that each customer's sites database (e.g., site details repository 142 of fleet data repository 144) will be autonomous. However, databases may be shared among customers. One example use case for using shared data can include a customer attempting to add a new location that the customer intends to begin sending drivers to using the embodiments disclosed herein. After typing in the address, a site is located, the primary address of which is a close match (e.g., within a threshold degree of accuracy) to the one the user entered. Site data may then be returned that shows the customer information in the database including maps, associated yards, gates, driving paths, attribution information for annotations or site detail creation, etc. The customer can accept most of the information, but may want to move the locations of certain elements slightly by clicking the map or specifying latitude/longitude information the user has captured from drivers or sensors, updating the instructions presented to the driver upon arrival, and changing the categorization of a point of interest (POI) that better suit the convention of the user's fleet.

The vehicle management system 150 may preserve the original data (replicate or provide a pointer), but also capture the new data that is specific to that customer and return the new data whenever the customer requests information on the site.

Multiple customers may end up with slightly different versions of the same site, e.g., with slightly different gate locations. GPS data, driver/user feedback, and other data from forms, jobs, etc., may be used to try to identify which of the versions of a site is most likely the "best" or at least the most widely recognized location, category, name, address, etc. In some cases, users can opt to use all or a part of a shared data record for a site. Alternatively, the user may maintain and use only the user's own data records, which may be maintained by the user or an entity managing the vehicle management system 150.

In some embodiments, multiple drivable paths, access paths, and/or routes may exist to or from a site location in a site. Further, multiple drivable paths, access paths, and/or routes may exist between sites. Advantageously, in certain embodiments, access paths may be combined with routes to enable a user to determine a lowest cost route while maintaining particular constraints over at least a portion of a route between sites or to/from a site location within a site.

Certain embodiments of the present disclosure provide a number of additional advantages. For example, embodiments herein provide the ability to specify preferred start (departure) and end (approach) paths including the creation, visualization, editing, and storing of the paths. Further, some embodiments provide the ability to short-circuit routing where an approach and departure intersect and the intersection is chosen automatically. In some cases, the specification of yards and gates to control access to a collection of locations within a campus-level site is provided. In some embodiments, connections between the path to the road network are created in such a way as to not hinder existing 2-point and 3-point street-link constraints, which may prevent implied u-turns or illegal for truck turns at the remote point of a path when it fully connects to the road network.

Some embodiments herein provide for partial-on-street and partial-off-street paths, which include remote points of a path on the street network. Further, embodiments described herein may be utilized to require the usage of a crossover (e.g., a wide turn crossing multiple lanes of traffic) as part of an approach or departure. Moreover, some embodiments can provide the ability to restrict usage of location, yard, gate, approach, and departure by estimated time or date, vehicle type, or any well-formed rule.

Certain embodiments provide the ability for multiple approaches to one site and departures from another site to overlap and be optimally determined by the shortest path routing algorithm, including an intersection of starting along any departure from one site and entering the approach on any approach to the next site. In some cases, the ability to have paths where the local point within the site is a gate instead of a location is provided. At routing, the selection of how to connect the location to the base map may be determined. Some examples of connecting the location to the base map may include: path(s) to/from location, path(s) to/from gate(s), gate(s) with no specified paths, legacy-style connection to nearest street link, etc. In some embodiments, custom navigation instructions may be specified, which may be presented to the driver upon reaching way points within an approach or departure path.

Terminology

As used herein, the term "road" in addition to having its ordinary meaning, can include, among other things, a street, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways. Moreover, the techniques described herein may also be applied for mixed mode routing. In other words, the embodiments disclosed herein may be used to determine access paths routes that include the use of multiple types of vehicles. For example, a route may be determined for a driver of the truck that also includes using a ferry. As another example, a route may combine the use of a car, a boat, and a train. In some cases, the mixed mode routing may also include a segment of walking, use of a bicycle, or public transportation, such as a subway or underground railroad network.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for calculating routes for a vehicle in a vehicle fleet, the system comprising:
   a hardware processor;
   a memory communicatively coupled with the hardware processor comprising processor executable instructions;
   a communication module comprising a receiver and a transmitter configured to communicate through a network;
   a sensor configured to access context information comprising location and speed information obtained using GPS or cellular tower triangulation, vehicle data, and solid state inertial information data for a vehicle in a vehicle fleet;
   a site details repository configured to store site details information for a site, the site details information comprising information regarding site locations within the site, the site locations being other than an address or geocoded address of the site;
   a fleet data repository comprising the context information and fleet site information comprising any of an identity of a gate, identity of the site locations within the site, hours of access, an identity of a specific road and a road network that should be used or excluded from use by the vehicles of the vehicle fleet sharing one or more of characteristics servicing the site, and whether drivers have permission to park their vehicles in the vehicle fleet overnight at the site collected by the vehicles in the vehicle fleet or its users, wherein the characteristics comprise any of characteristics of cargo carried by the vehicle in the vehicle fleet, characteristics of a job to be performed by a driver of the vehicle, characteristics of the vehicle, a weight of the vehicle, a size of the vehicle, live traffic information, historical traffic information, current weather, expected weather, vehicle energy type based on energy consumption, vehicle class, vehicle dimensions, vehicle capacity, vehicle energy functions, and vehicle maintenance history;
   a routing module, by executing the processor executable instructions, configured to generate a route for the vehicle of the vehicle fleet based on the fleet site information and the context information from a starting location to a first site location of the site locations within the site, wherein the routing module is operable to at least:
   identify a starting location for the route;
   receive a destination location for the route through the communication module over the network, the destination location comprising an identification of the site;
   determine an access path, the access path comprising a portion of a drivable route for the vehicle fleet based on the fleet site information and the context information between the starting location and the destination location; and
   calculate the route over a plurality of links on the road network from the starting location to the destination location, wherein the access path serves as a constraint in the calculation of the route that affects a determination of a lowest-constraint solution for the route to the destination location, wherein a constraint of the route with the access path is higher than a constraint cost for the route without the access path and wherein the constraint is based on one or more of time or distance.

2. The system of claim 1, wherein the access path is determined automatically based at least in part on the context information relating to one or more of the vehicle in the vehicle fleet, the cargo carried by the vehicle, and the driver.

3. The system of claim 1, wherein the access path is determined based on a selection of the access path by a user.

4. The system of claim 1, wherein the access path further comprises a drivable route within the site for the vehicle fleet.

5. The system of claim 1, wherein the access path further comprises a set of links in the road network between a gate of the site and a location between the starting location and the destination location.

6. The system of claim 5, wherein the gate comprises one of an entrance to the site, an exit to the site, or a bidirectional entrance and exit to the site for the vehicle fleet.

7. The system of claim 1, wherein the access path begins at a gate of the site.

8. The system of claim 1, wherein multiple access paths exist between a gate of the site and at least one site location within the site.

9. The system of claim 1, wherein multiple access paths exist to or from at least one site location within the site.

10. The system of claim 1, wherein multiple access paths exist to a gate of the site.

11. The system of claim 1, wherein the lowest cost constraint solution comprises a path configured to satisfy at least one of the following set of criteria: shortest route, fastest route, maximize use of highways, minimize use of highways, minimize toll roads, or maximize use of bonded roads.

12. A system for calculating routes for a vehicle in a vehicle fleet, the system comprising:

a processor;

a memory communicatively coupled with the processor comprising processor executable instructions;

a communication module comprising a receiver and a transmitter configured to communicate through a network;

a sensor configured to access context information comprising location and speed information obtained using GPS or cellular tower triangulation, vehicle data, and solid state inertial information data for a vehicle in a vehicle fleet;

a site details repository configured to store site details information for a site, the site details information comprising information regarding site locations within the site, the site locations being other than an address or geocoded address of the site;

a fleet data repository comprising the context information and fleet site information comprising any of an identity of a gate, identity of the site locations within the site, hours of access, an identity of a specific road and a road network that should be used or excluded from use by vehicles of a vehicle fleet sharing one or more of characteristics servicing the site, and whether drivers have permission to park their vehicles overnight at the site collected by the vehicles in the vehicle fleet or its users, wherein the characteristics comprises any of characteristics of cargo carried by the vehicle, characteristics of a job to be performed by the driver, characteristics of the vehicle, a weight of the vehicle, a size of the vehicle, live traffic information, historical traffic information, current weather, expected weather, vehicle energy type based on energy consumption, vehicle class, vehicle dimensions, vehicle capacity, vehicle energy functions, vehicle maintenance history, and the context information;

a routing module, by executing the processor executable instructions, configured to generate a route of a vehicle of the vehicle fleet from a starting location to a first site location of the site locations within the site, wherein the routing module is operable to at least:

receive an identity of a destination site from a set of sites through the communication module over the network, the destination site comprising the site;

access the site details information, the context information, and the fleet site information for the destination site from the site details repository and the fleet data repository;

access routing criteria for routing the vehicle of the vehicle fleet, wherein the routing criteria comprises the context information relating to selecting an access path, the access path comprising a drivable route for the vehicle fleet from a road network to one of the site locations within the destination site;

select a site location at the destination site based at least in part on the routing criteria and the site details information associated with the destination site; and select the access path to the site location based at least in part on the routing criteria and the site details information.

13. The system of claim 12, wherein the routing module is further operable to select a gate of the destination site based at least in part on the routing criteria and the site details information, wherein the access path comprises a drivable path for the vehicle fleet between the gate and the site location.

14. The system of claim 13, wherein the access path further comprises a set of links in the road network between the gate and a location between the starting location and the gate.

15. The system of claim 12, wherein the routing module is further operable to calculate the route over a plurality of links on the road network from the starting location to the destination location, the route including the access path regardless of whether the access path represents a lowest-constraint solution for the route to the destination location.

16. The system of claim 15, wherein the routing module calculates the route based at least in part on the routing criteria, wherein the routing criteria further comprises selection of a constraint criteria used in determining the lowest-constraint solution for the route.

17. The system of claim 12, wherein the site location comprises at least one of: a building at the destination site, a loading dock of the building, a refrigerated loading dock of the building, a particular side of the building, a trash location collection at the destination site, a parking location at the destination site, a delivery entrance of the building, a customer entrance of the building, a long-term parking location at the destination site, an overnight parking location at the destination site, a gate, an inner gate within the site, a security station, or a user-specified location at the destination site.

18. The system of claim 12, wherein the context information comprises at least one of: preferences of the driver, a number of hours the driver has worked, a number of hours the driver is permitted to work over a period of time, a type of the vehicle, an owner of the vehicle, an entity associated with the vehicle fleet, characteristics of cargo carried by the vehicle, characteristics of a job to be performed by the driver, characteristics of the vehicle, a weight of the vehicle, a size of the vehicle, live traffic information, historical traffic information, current weather, or expected weather.

19. The system of claim 12, wherein the routing criteria further comprises a time of day, an agreement with a governmental entity with jurisdiction over the destination site, and an agreement between an entity that owns the destination site and an entity that owns the vehicle fleet.

20. The system of claim 12, wherein the context information is accessed from a number of sensors included in the vehicle.

21. The system of claim 12, wherein the road network comprises a plurality of links between the set of sites and excludes drivable routes within the set of sites.

* * * * *